United States Patent
Wereley et al.

(10) Patent No.: US 7,822,522 B2
(45) Date of Patent: Oct. 26, 2010

(54) ADAPTIVE ENERGY ABSORPTION SYSTEM FOR A VEHICLE SEAT

(75) Inventors: Norman Mark Wereley, Potomac, MD (US); Gregory John Hiemenz, Silver Spring, MD (US); Young-Tai Choi, Laurel, MD (US); Gang Wang, Bethesda, MD (US); Peter Che-Hung Chen, Clarksville, MD (US)

(73) Assignees: Techno-Sciences, Inc. (corporation), Calverton, MD (US); University of Maryland, Riverdale, MD (US)

( * ) Notice: Subject to any disclaimer, the term of this patent is extended or adjusted under 35 U.S.C. 154(b) by 799 days.

(21) Appl. No.: 11/670,773

(22) Filed: Feb. 2, 2007

(65) Prior Publication Data

US 2008/0015753 A1 Jan. 17, 2008

Related U.S. Application Data

(60) Provisional application No. 60/809,386, filed on May 31, 2006.

(51) Int. Cl.
*F16F 9/53* (2006.01)
(52) U.S. Cl. .............. 701/45; 188/267.1; 248/550; 297/303.4; 297/300.5; 340/540
(58) Field of Classification Search .............. 701/45; 296/68.1; 73/862.041, 862.59; 188/267.1, 188/279; 297/472, 250.1, 254, 216.16, 303.4, 297/300.5; 248/550, 618; 267/131; 340/540; *F16F 9/53*
See application file for complete search history.

(56) References Cited

U.S. PATENT DOCUMENTS

| | | | | |
|---|---|---|---|---|
| 3,701,499 A | 10/1972 | Schubert et al. | ......... | 244/17.27 |
| 3,807,678 A * | 4/1974 | Karnopp et al. | ......... | 248/562 |
| 4,363,377 A | 12/1982 | Van Gerpen | ........... | 180/282 |
| 4,821,849 A * | 4/1989 | Miller | ........... | 188/280 |
| 4,881,172 A * | 11/1989 | Miller | ........... | 701/37 |
| 4,887,699 A | 12/1989 | Ivers et al. | ........... | 188/378 |
| 4,936,425 A * | 6/1990 | Boone et al. | ........... | 188/266.1 |
| 4,964,455 A * | 10/1990 | Meyer | ........... | 164/468 |
| 4,972,928 A | 11/1990 | Sirven | ........... | 188/269 |

(Continued)

OTHER PUBLICATIONS

Choi, Y-T, et al., "Mitigation of Biodynamic Response to Vibratory and Blast-Induced Shock Loads Using Magnetorheological Seat Suspensions", *Proceedings of the Institution of Mechanical Engineers, Part D (Journal of Automobile Engineering)*, vol. 219, No. D6, Jun. 2005, pp. 741-753; available to on-line subscribers on May 7, 2005.

(Continued)

*Primary Examiner*—Tuan C To
(74) *Attorney, Agent, or Firm*—Ober / Kaler; Royal W. Craig

(57) ABSTRACT

An adaptive energy absorption system for a vehicle seat is disclosed, utilizing an adaptive energy absorber or variable profile energy absorber (VPEA) for mitigating occupant injury due to extreme vehicle movement (e.g., during a vehicle shock event), and/or for mitigating vibration experienced by an occupant of the vehicle seat during normal vehicle operating conditions. The adaptive energy absorption system achieves the aforementioned objectives for a wide range of occupant weights and load levels. Various configurations of dual-goal energy absorption apparatuses that enable both shock mitigation and vibration isolation are disclosed.

25 Claims, 34 Drawing Sheets

U.S. PATENT DOCUMENTS

| | | | | |
|---|---|---|---|---|
| 5,276,622 | A | | 1/1994 | Miller et al. ............ 364/424.05 |
| 5,276,623 | A | * | 1/1994 | Wolfe ......................... 701/37 |
| 5,277,281 | A | | 1/1994 | Carlson et al. ............. 188/267 |
| 5,358,305 | A | * | 10/1994 | Kaneko et al. ........... 296/65.02 |
| 5,536,059 | A | * | 7/1996 | Amirouche ............. 296/65.02 |
| 5,569,432 | A | | 10/1996 | Maciejewski ............... 264/439 |
| 5,652,704 | A | * | 7/1997 | Catanzarite .................. 701/49 |
| 5,712,783 | A | * | 1/1998 | Catanzarite .................. 701/37 |
| 5,732,370 | A | * | 3/1998 | Boyle et al. .................. 701/37 |
| 5,906,767 | A | | 5/1999 | Karol et al. .............. 252/62.52 |
| 6,000,703 | A | | 12/1999 | Schubert et al. .......... 280/5.518 |
| 6,082,715 | A | * | 7/2000 | Vandermolen ............... 267/131 |
| 6,115,658 | A | | 9/2000 | Ahmadian et al. ............ 701/37 |
| 6,120,082 | A | * | 9/2000 | Vandermolen ............. 296/68.1 |
| 6,206,152 | B1 | | 3/2001 | Grundei et al. .......... 188/266.1 |
| 6,311,110 | B1 | | 10/2001 | Ivers et al. .................... 701/37 |
| 6,371,459 | B1 | | 4/2002 | Schick et al. ............... 267/131 |
| 6,378,558 | B1 | | 4/2002 | Pohl et al. .................... 137/827 |
| 6,382,604 | B2 | | 5/2002 | St. Clair ..................... 267/131 |
| 6,424,894 | B2 | | 7/2002 | St. Clair ..................... 701/37 |
| 6,491,313 | B1 | | 12/2002 | Rui et al. ..................... 280/90 |
| 6,655,511 | B1 | | 12/2003 | Lun et al. ................... 188/267 |
| 6,694,856 | B1 | | 2/2004 | Chen et al. ................. 89/43.01 |
| 6,786,311 | B2 | | 9/2004 | Lun et al. ................ 188/267.2 |
| 6,860,369 | B2 | | 3/2005 | Weiffen et al. ........... 188/282.4 |
| 6,874,603 | B2 | | 4/2005 | Lisenker et al. .......... 188/267.2 |
| 6,886,650 | B2 | | 5/2005 | Bremner .................. 180/89.13 |
| 6,903,280 | B2 | * | 6/2005 | Selig et al. .................... 177/144 |
| 6,950,031 | B2 | * | 9/2005 | Selig et al. .................... 340/666 |
| 6,953,108 | B2 | | 10/2005 | Anderfaas et al. ........ 188/267.2 |
| 7,051,849 | B2 | | 5/2006 | Browne et al. ............. 188/267 |
| 7,070,707 | B2 | | 7/2006 | Klintz et al. ............. 252/62.52 |
| 7,087,184 | B2 | | 8/2006 | Klintz et al. ............. 252/62.52 |
| 7,219,923 | B2 | * | 5/2007 | Fujita et al. ................. 280/735 |
| 7,624,850 | B2 | * | 12/2009 | Namuduri et al. ......... 188/267.2 |
| 2001/0037169 | A1 | | 11/2001 | Clair ........................... 701/37 |
| 2002/0154020 | A1 | * | 10/2002 | Sumi et al. .................. 340/667 |
| 2004/0112659 | A1 | | 6/2004 | Kramer et al. ........... 180/89.12 |
| 2005/0082127 | A1 | | 4/2005 | Barber et al. ............ 188/266.2 |
| 2005/0098399 | A1 | | 5/2005 | Bremner ..................... 188/266 |

OTHER PUBLICATIONS

Choi, Seung-Bok, et al., "Vibration Control of a MR Seat Damper for Commercial Vehicles", *Journal of Intelligent Material Systems and Structures*, vol. 11, Dec. 2000, pp. 936-944.

Choi, S. B., et al., "Vibration Control of an ER Seat Suspension for a Commercial Vehicle", *Transactions of the ASME*, vol. 125, Mar. 2003, pp. 60-68.

Park, Chanho, et al., "Semiactive Vibration Control of a Smart Seat with an MR Fluid Damper Considering Its Time Delay", *Journal of Intelligent Material Systems and Structures*, vol. 13, Jul./Aug. 2002, pp. 521-524.

Desjardins, Stanley P., "The Evolution of Energy Absorption Systems for Crashworthy Helicopter Seats", *American Helicopter Society 59th Annual Forum*, Phoenix, Arizona, May 6-8, 2003, 26 pages.

McManus, S. J., et al., "Evaluation of Vibration and Shock Attenuation Performance of a Suspension Seat with a Semi-Active Magnetorheological Fluid Damper", *Journal of Sound and Vibration*, vol. 253, No. 1, 2002, pp. 313-327.

Wu, X., et al., "A Semi-Active Control Policy to Reduce the Occurrence and Severity of End-Stop Impacts in a Suspension Seat with an Electrorheological Fluid Damper", *Journal of Sound and Vibration*, vol. 203, No. 5, 1997, pp. 781-793.

Choi, Young-Tai, et al., "Biodynamic Response Mitigation to Shock Loads Using Magnetorheological Helicopter Crew Seat Suspension", *Journal of Aircraft*, vol. 42, No. 5, Sep.-Oct., 2005, pp. 1288-1295.

\* cited by examiner

EXEMPLARY SHOCK ACCELERATION PULSES:
(A) TRIANGULAR
(B) HALF-SINE
(C) SQUARE
(D) COMBINATION

ADAPTIVE ENERGY ABSORPTION SYSTEM FOR A VEHICLE SEAT

CROSS-REFERENCE TO RELATED APPLICATIONS

This Application claims priority to U.S. Provisional Patent Application Ser. No. 60/809,386, filed May 31, 2006, which is hereby incorporated by reference herein in its entirety. This Application is also related to U.S. patent application Ser. No. 11/670,761, filed on the same date herewith, which is also hereby incorporated by reference herein in its entirety.

STATEMENT REGARDING FEDERALLY SPONSORED RESEARCH OR DEVELOPMENT

Work relating to the subject matter of this patent application may have been performed with U.S. Government support under Contract No. N00421-06-C-0006, awarded by Naval Air Warfare Center AD (PAX). The U.S. Government may have certain rights in this invention.

FIELD OF THE INVENTION

The invention relates generally to energy absorbers and energy absorption systems, and more particularly to shock and vibration energy absorption systems for vehicle seats. Various configurations of dual-goal energy absorption apparatuses that enable both shock mitigation and vibration isolation are disclosed along with an adaptive energy absorption system for a vehicle seat for mitigating occupant injury due to extreme vehicle movement (e.g., during a vehicle shock event), and/or for mitigating vibration experienced by an occupant of the vehicle seat during normal vehicle operating conditions.

BACKGROUND OF THE INVENTION

The minimization of shock load-induced injury is an important issue in seat suspension design. Occupant spinal and pelvic injuries, for example, may result from harsh vertical/crash landings of aircraft, as well as from vertical shock of land and marine vehicles. The severity of resulting spinal, pelvic, or other injuries may be considerably minimized if vehicles are equipped with crashworthy seat designs. A seat suspension system can be used to mitigate the vertical shock loads that are transmitted from the base of the vehicle (or extension thereof), and imparted into the human body. The attenuation of vertical impact forces in vehicle mishaps is one of the prime factors in determining survivability.

Energy absorbers, also known as energy attenuators or load limiters, are a key component of crashworthy seat designs. Energy-absorbing crew seats for helicopter applications, for example, have made significant improvements in helicopter crash survival. Early crashworthy crew seats used fixed-load energy absorbers (FLEAs) to limit the load on an occupant's spine. One drawback associated with these FLEAs, however, is that they were not adjustable and stroked at a factory-established, constant load throughout their entire operating range. Variable load energy absorbers (VLEAs) were designed to address this drawback.

A VLEA enables an occupant to manually adjust the constant stroking load by setting a control (e.g., a dial) to the occupant's weight. The load increases for large occupants, for example, taking advantage of their greater spinal load tolerance to reduce the stroked distance. By contrast, the load decreases for smaller occupants to reduce the risk of injury to their weaker spines. A VLEA enables a seat to deliver the same low-injury risk regardless of occupant weight. VLEAs were developed with a provision so that a wide range of occupants would have equal protection in a crash. An energy absorber load is selected that is proportional to the occupant's weight so that each occupant will experience similar acceleration and use similar stroking space in a crash.

FLEAs and VLEAs are known as fixed profile energy absorbers (FPEAs) because they have a constant load-stroke curve. One drawback associated with FPEAs is that they are passive, meaning that they cannot adapt their energy absorption or stroking profiles as a function of occupant weight, or as a function of real-time environmental measurements such as a vibration or shock load. Seat suspension systems that utilize FPEAs suffer from these and other drawbacks.

SUMMARY OF THE INVENTION

The invention addressing these and other drawbacks in the art relates to an adaptive energy absorption system for a vehicle seat utilizing an adaptive energy absorber or variable profile energy absorber (VPEA) for mitigating occupant injury due to extreme vehicle movement (e.g., during a vehicle shock event), and/or for mitigating vibration experienced by an occupant of the vehicle seat during normal vehicle operating conditions. The adaptive energy absorption system achieves the aforementioned objectives for a wide range of occupant weights and load levels.

The adaptive energy absorption system, as described herein, may be used with any type of vehicle seats including, but not limited to, aircraft seats, land vehicle seats, marine vehicle seats, or seats for other vehicles that may experience vertical (or other) shock loads (whether it be a one-time event or repetitive shock), or that may be exposed to varying levels of vibration during normal operating conditions. In various implementations, the adaptive energy absorption system may be integral with a vehicle seat, or retro-fit to existing vehicle seats.

The adaptive energy absorption system of the invention may further comprise, in addition to the VPEA, a controller (e.g., a single-mode or multi-mode controller), and one or more sensors for measuring, among other things, force, acceleration, velocity, strain, displacement, etc. The adaptive energy absorption system may also interface with existing vehicle sensors (e.g., an aircraft altimeter to measure sinkrate). Moreover, the adaptive energy absorption system may additionally comprise a fixed profile energy absorber (FPEA) and/or a stiffness element (e.g., to supplement VPEA force and aid in vibration isolation) alone or in combination with the VPEA. In one implementation, one or more components of the adaptive energy absorption system may be powered by a power source independent of the vehicle (e.g., via one or more batteries). The independent power source enables the system to continue to function in the event of a loss of vehicle power due to, for example, a shock event, or for any other reason.

According to an aspect of the invention, the VPEA may respond to changing environmental stimuli such as occupant weight, occupant attitude, load level, or other stimuli, to effectively mitigate loads into the occupant's body. During normal operating conditions, for example, the VPEA may be automatically adjusted in real-time to minimize occupant motion based upon a known occupant weight (e.g., automatically sensed or manually adjusted) and known vibration levels (e.g., from sensors). Limiting seat motion provides the advantages of enhancing comfort and reducing fatigue for the occupant of the vehicle seat. During an extreme motion event (e.g., a shock event), motion sensors may trigger the controller in to a secondary mode, wherein the VPEA may be automatically adjusted to keep body loads (pelvic loads, spinal loads, etc.) within acceptable levels.

One advantage provided by the invention is that the controller may automatically adjust the VPEA in real-time to optimize occupant body loads based on a feedback control algorithm. For example, sensors for measuring VPEA stroke (e.g., Linear Variable Differential Transformers (LVDTs)) as well as accelerometers on the vehicle floor, vehicle seat, and/or occupant helmet (or other wearable article) may provide measurements which are fed back to the control algorithm. The control algorithm may then use this sensor data to maintain body loads (e.g., lumbar force, chest accelerations, etc.) below injury limits.

An additional advantage provided by the invention is the capability to adapt to a varying range of occupants. VPEAs have the ability to vary their load-stroke profile to account for occupant weight. The occupant weight may be determined by a manual setting, or via sensor measurement, and then used to automatically tune the system for the dynamics of the occupant as well as the occupant's injury criteria. Using the occupant weight value, statistical biodynamic data may be used to develop relationships between occupant weight, dynamic parameters, and injury criteria. The controller may use the aforementioned sensor data to determine occupant motion/loads and/or a mathematical biodynamic model (such as a lumped parameter model) to estimate occupant motion/loads in order to determine how to adjust the VPEA to maintain body loads below injury criteria. If a mathematical biodynamic model is utilized, dynamic parameters may be automatically updated based upon the occupant weight. Alternatively, the controller may use a gain schedule to adjust the VPEA in a pre-determined manner for given set parameters such as motion, weight, injury criteria, etc.

Yet another advantage provided by the invention is the capability to adapt to varying shock input levels. Real-time environmental measurements may be used to tune the system to the harshness of each particular event. This is an advantage over conventional seat energy absorption systems which tend to be tuned for a fixed shock level (thus, not optimally controlling body loads for other shock levels).

Still yet another advantage provided by the invention is that real-time feedback control may be used to optimally control the VPEA to mitigate vibration due to normal vehicle operation; thereby enhancing comfort and reducing fatigue for the occupant. In one implementation, the same controller used for shock control may be utilized for vibration control. Alternatively, a multi-mode controller may be used that minimizes occupant vibration during normal operation, and then switches to a shock control mode during an extreme motion event. Once an extreme motion event is measured, the controller may switch to a shock control mode to prevent occupant injury.

According to a further aspect of the invention, various configurations of dual-goal energy absorption apparatuses that enable both shock mitigation and vibration isolation are disclosed in detail herein. As noted above, in one implementation, the VPEA may be automatically adjusted in real-time to keep body loads (pelvic loads, spinal loads, etc.) within acceptable levels during a vehicle shock event (or other extreme motion event). For implementations wherein vibration isolation is desired, a stiffness element (e.g., a coil spring) may be introduced into the system to reduce the system fundamental resonance and to rebound the VPEA. In shock mitigation design, however, a stiffness element is undesirable because it stores energy and provides a potentially injurious or even lethal rebound reaction into the occupant. These conflicting design requirements have previously provided a formidable challenge to the utilization of one energy absorber for both shock mitigation and vibration isolation. Accordingly, to address this and other challenges, various dual-goal energy absorption apparatuses are disclosed that provide suitable stiffness for vibration isolation, whereas, in extreme motion events, the stiffness is removed. Although these dual-goal energy absorption apparatuses are described herein in the context of an adaptive energy absorption system for a vehicle seat, it should be recognized that they may be utilized in a variety of other applications without limitation.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF THE INVENTION

An adaptive energy absorption system is disclosed for use with any type of vehicle seats including, but not limited to, aircraft (e.g., rotorcraft, fixed wing, etc.) seats, land vehicle seats (e.g., seats for heavy-duty military, agricultural, and construction vehicles, etc.), marine vehicle seats, or seats for other vehicles that may experience vertical (or other) shock loads, or that may be exposed to varying levels of vibration during normal operating conditions.

Figure 1:
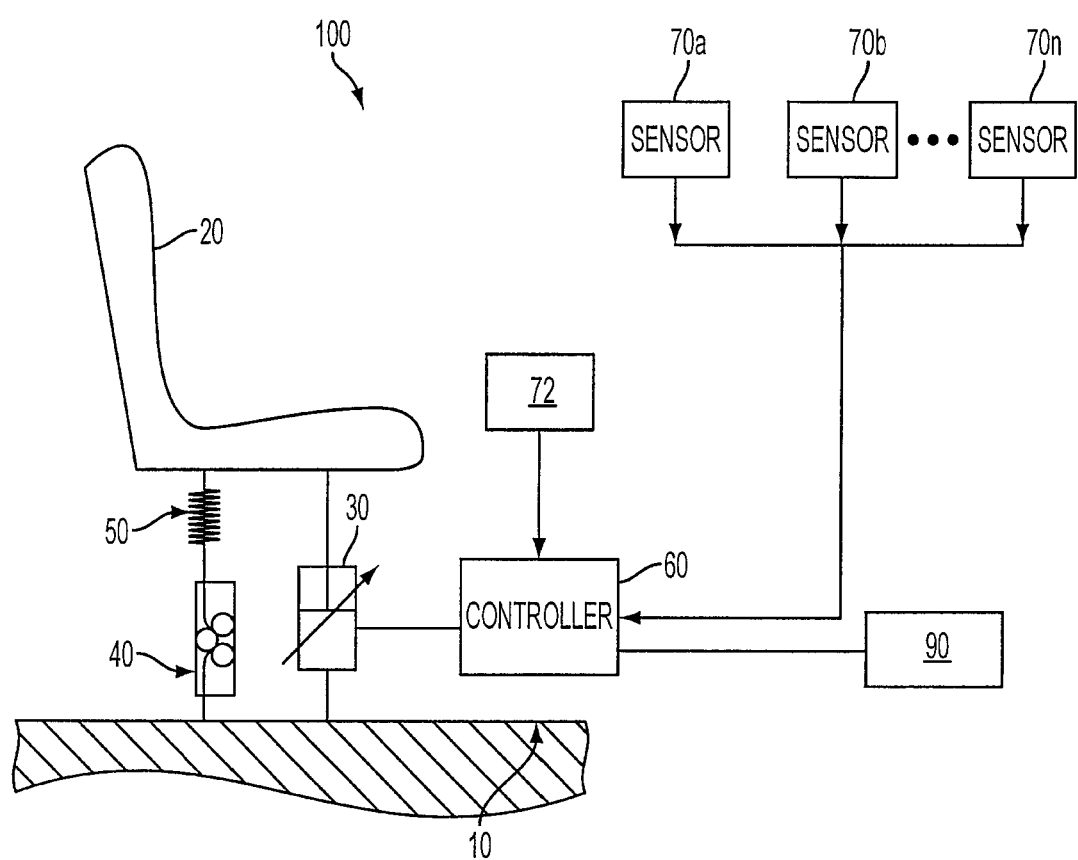
FIG. 1 is an exemplary illustration of an adaptive energy absorption system for a vehicle seat, according to an aspect of the invention.

With particular reference to FIG. 1, adaptive energy absorption system 100 is provided for a vehicle seat 20. In one implementation, vehicle seat 20 may comprise an existing vehicle seat, and one or more of the components of system 100 (as disclosed herein) may be retrofit to vehicle seat 20. Alternatively, vehicle seat 20 along with one or more components of system 100 may be provided together as an integral system for installation in a vehicle.

According to an aspect of the invention, an adaptive energy absorber or variable profile energy absorber (VPEA) 30 may be operatively connected to vehicle seat 20, and to a base 10 of a vehicle (or extension thereof). VPEA 30 may comprise an active valve damper, a magnetorheological (MR) fluid damper, an electroheological (ER) fluid damper, or other adjustable energy absorber. In various implementations, VPEA 30 may be provided alone, or in combination with a fixed profile energy absorber (FPEA) 40 (e.g., wire-bender, composite crushable tube, etc.) and/or a stiffness element 50 (e.g., a coil spring, leaf spring, visco-elastic material, etc.) in any number of configurations. In one implementation, for example, and as described in greater detail below, one structure comprising a stiffness element 50 releasably coupled to VPEA 30 may be provided for both shock mitigation and vibration isolation.

System 100 may further comprise a controller 60 (e.g., a single-mode or multi-mode controller) that may automatically adjust VPEA 30 in real-time to an optimal setting based on feedback from a weight indication mechanism 72 and/or one or more sensors ($70a$, $70b$ . . . $70n$) which will be described in detail below. One or more components of system 100 may be powered by a power source 90, as described in greater detail below.

As a general overview, VPEA 30 may respond to changing environmental stimuli such as occupant weight, occupant attitude, load level, or other stimuli, to effectively mitigate loads into the occupant's body. According to one implementation of the invention, controller 60 may operate only in a mode to mitigate injury to an occupant of vehicle seat 20 when an occurrence of a vehicle shock event (or other extreme motion event) is determined.

In another implementation, controller 60 may be used to adjust VPEA 30 for purposes of vibration isolation and shock mitigation. For example, during normal (vehicle) operating conditions, controller 60 may operate in a first mode to automatically adjust VPEA 30 in real-time to minimize occupant motion based upon a known occupant weight (e.g., automatically sensed or manually adjusted) and/or known vibration levels (e.g., from sensors). Limiting motion of vehicle seat 20 provides the advantages of enhancing comfort and reducing fatigue for the occupant of vehicle seat 20. During an extreme motion event (e.g., a vehicle shock event), motion sensors may trigger controller 60 in to a second mode, wherein VPEA 30 may be automatically adjusted to keep body loads (pelvic loads, spinal loads, etc.) within acceptable levels.

Prior to describing the various control strategies that may be implemented for vibration isolation and/or shock mitigation, an explanation of the one or more components that may comprise system 100 (FIG. 1) will now be provided. It should be recognized, however, that one or more of the components of system 100 (depicted in FIG. 1) may or may not be present (or may be present in various configurations) in different implementations of the invention, depending on whether system 100 is utilized for vibration isolation and/or shock mitigation. Accordingly, the depiction of system 100 in FIG. 1 is exemplary only, and should not be viewed as limiting. Additional configurations of system 100 will be described below and illustrated in the accompanying drawing figures.

Power Source.

According to an aspect of the invention, one or more components of system 100 may be powered by a power source 90. In one implementation, power source 90 may comprise a power source associated with the vehicle. Alternatively, power source 90 may comprise a source (e.g., one or more batteries) independent of the vehicle so as to enable system 100 to continue to function in the event of a loss of vehicle power due to, for example, a shock event, or for any other reason. According to yet another alternative implementation, one or more components of system 100 may be powered by a power source associated with the vehicle, while power source 90 serves as a "back-up," independent power source which will activate upon a loss of vehicle power. Other configurations may be implemented.

Sensors.

According to an aspect of the invention, to control VPEA 30, one or more sensors (70$a$, 70$b$, ... 70$n$) may be provided to yield real-time motion information. For example, in one implementation, at least one sensor may be provided on vehicle seat 20, and one sensor may be provided on base 10 of the vehicle (e.g., on the floor of the vehicle, or on a platform or other structure to which vehicle seat 20 may operatively connected) so that the input load levels as well motion of the occupant (both absolute & relative) may be determined. Depending on the design of the control system, sensors (70$a$, 70$b$, ... 70$n$) may measure force (e.g, load cells), acceleration (e.g., accelerometers), velocity (e.g., PVTs, etc.), strain/displacement (e.g., LVDT, strain gauge, etc), vehicle position, and/or vehicle attitude. In some implementations, one or more of sensors (70$a$, 70$b$, ... 70$n$) may comprise, or interface to, existing vehicle sensors (e.g., an aircraft altimeter to measure sinkrate).

In one implementation, a weight indication mechanism 72 may also be used to obtain an occupant's weight (or mass) to tune the system to the occupant. Weight indication mechanism 72 may comprise a control for enabling an occupant to manually select his or her weight, a weight sensor (e.g. strain gauge) positioned on vehicle seat 20, or other mechanism for obtaining the weight of an occupant of vehicle seat 20.

In addition to occupant weight, sensor(s) determining occupant position and/or attitude within vehicle seat 20 may also be provided. For example, one or more PVDF sensors in (or associated with) vehicle seat 20 may be used to measure occupant center of gravity (CG). An array of proximity/position sensors in (or associated with) vehicle seat 20 may be used to determine body position, and an array of force or strain sensors in (or associated with) the structure of vehicle seat 20 may also be utilized to measure occupant CG. Additional implementations exist.

In one implementation, one or more of sensors (70$a$, 70$b$, ... 70$n$) may be body-mounted such as, but not limited to, those mounted on a helmet, clothing, etc. of the occupant of vehicle seat 20 to measure real-time body loads.

Due to the numerous configurations and possible placement positions of one or more sensors (70$a$, 70$b$, ... 70$n$), they have been illustrated generally in FIG. 1. Various other types of sensors may be implemented as would be appreciated by those having skill in the art.

Controller.

As known and understood by those having skill in the art, controller 60 may comprise a processor, as well as a memory for storing one or more control algorithms for execution by the processor. The memory also stores data that may be used and/or produced by execution of the one or more control algorithms. Controller 60 interfaces with, and receives measurement signals (controller inputs) from, one or more sensors (70$a$, 70$b$, ... 70$n$) and/or weight indication mechanism 72. Based on processing performed, controller 60 interfaces with, and generates one or more control signals (controller outputs) to control one or more components of system 100 (e.g., VPEA 30).

According to one implementation, controller 60 may comprise a single-mode controller that may operate only in a mode to mitigate injury to an occupant of vehicle seat 20 when an occurrence of a vehicle shock event (or other extreme motion event) is determined.

In an alternative implementation, controller 60 may function to provide vibration isolation during normal vehicle operation, and to mitigate (or prevent) bodily injury to an occupant of vehicle seat 20 during a vehicle shock event. Controller 60 may, for instance, comprise a single-mode controller, wherein the same control law (or algorithm) may be used to both minimize vibration, and optimize body loads during a vehicle shock event. Controller 60 may alternatively comprise a dual-mode controller having a first control mode (which may be referred to herein as a normal or vibration control mode), and a second control mode (which may be referred to herein as a shock control mode). Each of the modes of controller 60 are discussed in greater detail below with reference to FIGS. 12-14.

Variable Profile Energy Absorber (VPEA).

According to an aspect of the invention, VPEA 30 may comprise an adjustable energy absorber that can modify its energy absorbing capabilities as commanded by a feedback control system. Examples of such devices, as noted above, may include, but are not limited to, active value dampers, magnetorheological (MR) fluid dampers, and electrorheological (ER) fluid dampers, etc. Using feedback control, these dampers may adjust the load profile as vehicle seat 20 strokes, for example, during a crash or other vehicle shock event.

MR and ER fluid dampers, in particular, are advantageous because they are able to achieve what is effectively an infinitely adjustable profile energy absorber, as described below. MR fluid dampers, in particular, are advantageous in that they are easily powered by a DC electrical supply (e.g., battery) which facilitates the provision of an independent power source (e.g., power source 90), as described above.

By way of background, ER and MR fluids possess the ability to change properties when electric or magnetic fields are applied thereacross, respectively. This change is mainly manifested as a substantial increase in dynamic yield stress, or apparent viscosity, of the fluid. ER and MR fluids exhibit nonlinear effects due to applied field, applied loads, strain amplitude, and frequency of excitation in dynamic displacement conditions.

Figure 2:
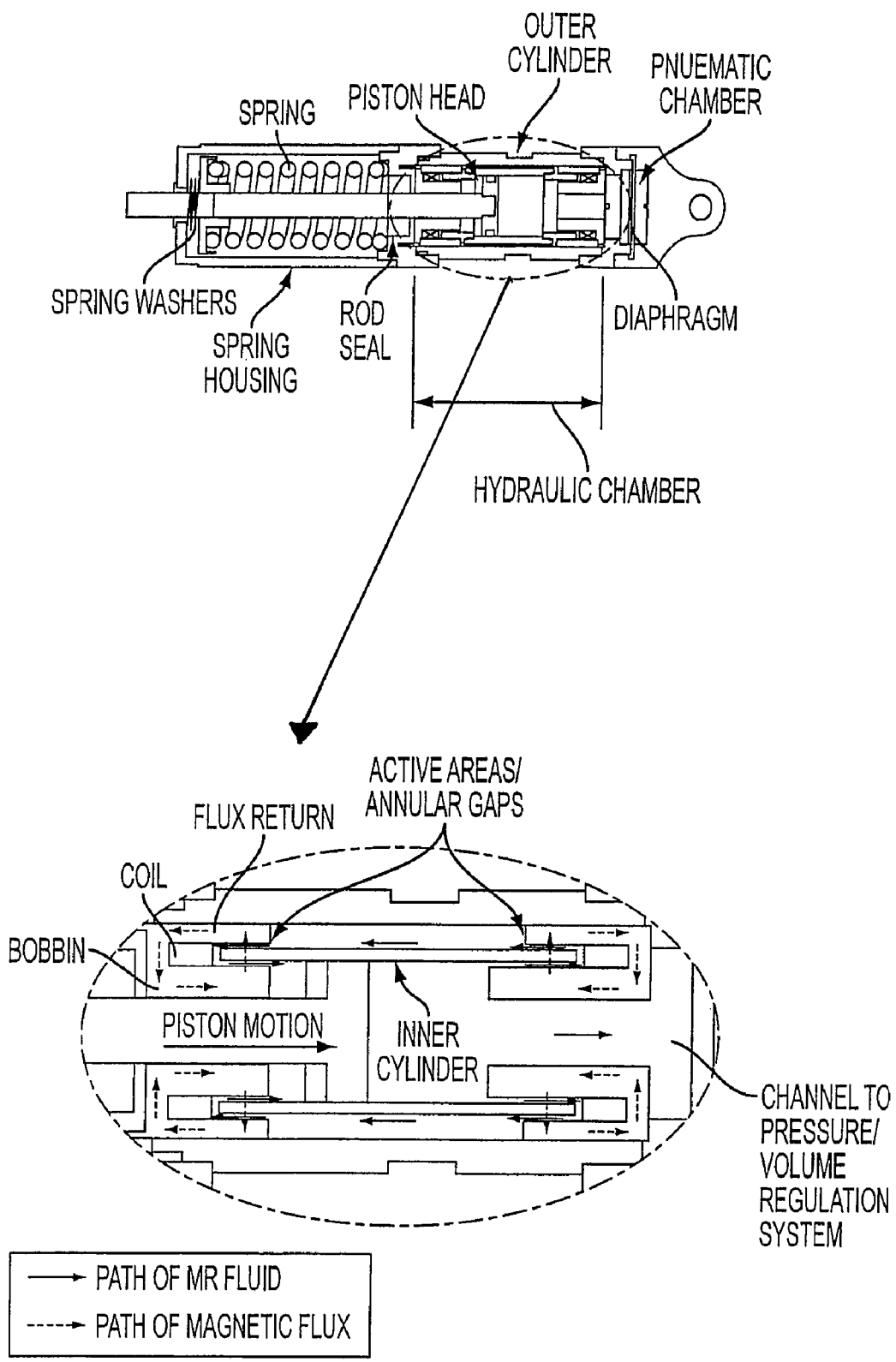
FIG. 2 is an exemplary illustration of a sample MR damper design.

The application of ER & MR fluids to the valve of a damper in the presence of a controllable electric/magnetic field results in the semi-active device known as an ER & MR damper, respectively. FIG. 2 is an exemplary illustration of a sample MR damper design. An explanation of the operation of an MR damper will not be provided herein, as MR dampers are known and understood by those having skill in the art. One example of an MR damper may be found in U.S. Pat. No. 6,694,856 B1 (issued Feb. 24, 2004), entitled "MAGNE-TORHEOLOGCAL DAMPER AND ENERGY DISSIPATION METHOD" to Chen et al., which is hereby incorporated by reference herein in its entirety.

Figure 3:
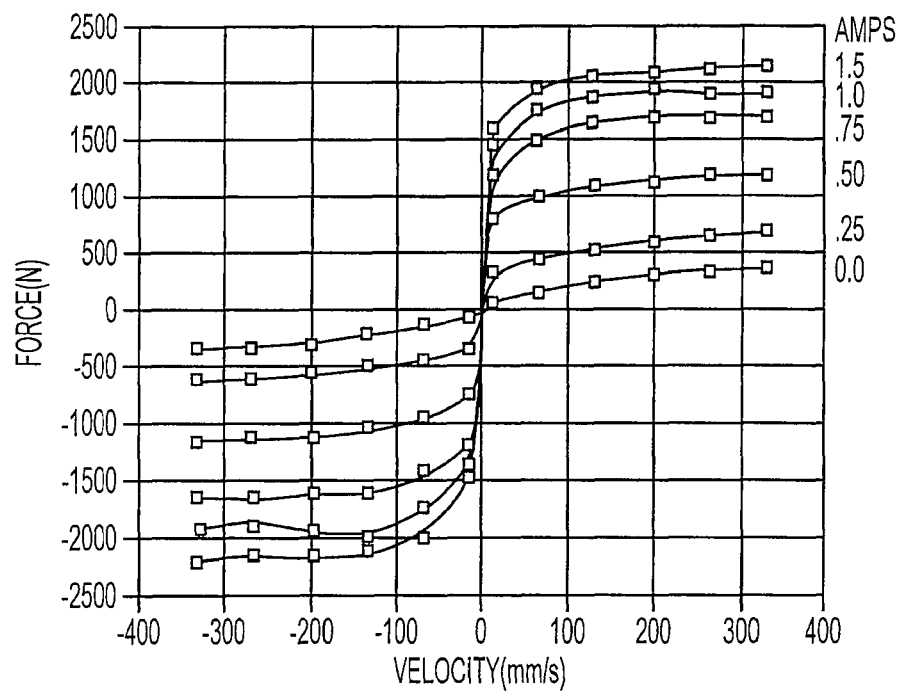
FIG. 3 is an illustration of a graphical view showing force v. velocity with respect to damping at various applied currents.

FIG. 3 illustrates representative test data obtained from a COTS Lord Rheonetics™ damper showing the force vs. piston velocity behavior as a function of applied field. As depicted, the damper force can be broken into two regimes, preyield and postyield. The preyield portion tends to be fairly rigid and is often approximated as Coulomb damping, while the postyield is plastic and is often approximated as viscous damping.

Figure 4:
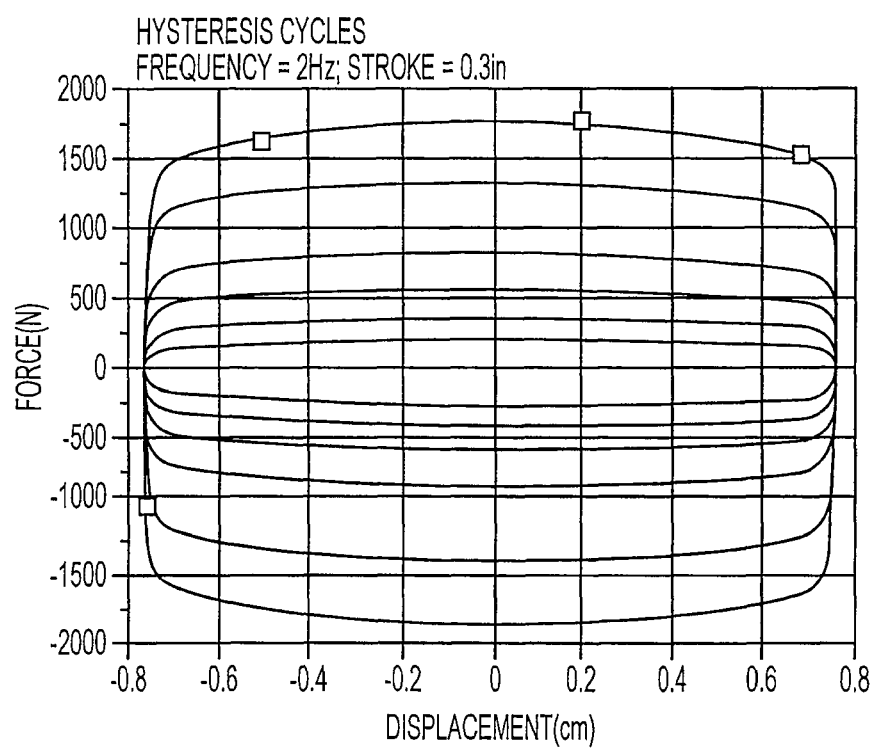
FIG. 4 is an illustration of a graphical view of hysteresis cycle with respect to displacement.

FIG. 4 illustrates representative force vs. piston displacement behavior for an MR damper. The total energy dissipated by the damper is represented by the area within the depicted hysteresis curves. As the applied field is increased, the hysteresis loop increases in size, thereby increasing the amount of energy that can be dissipated by the damper.

Figure 5:
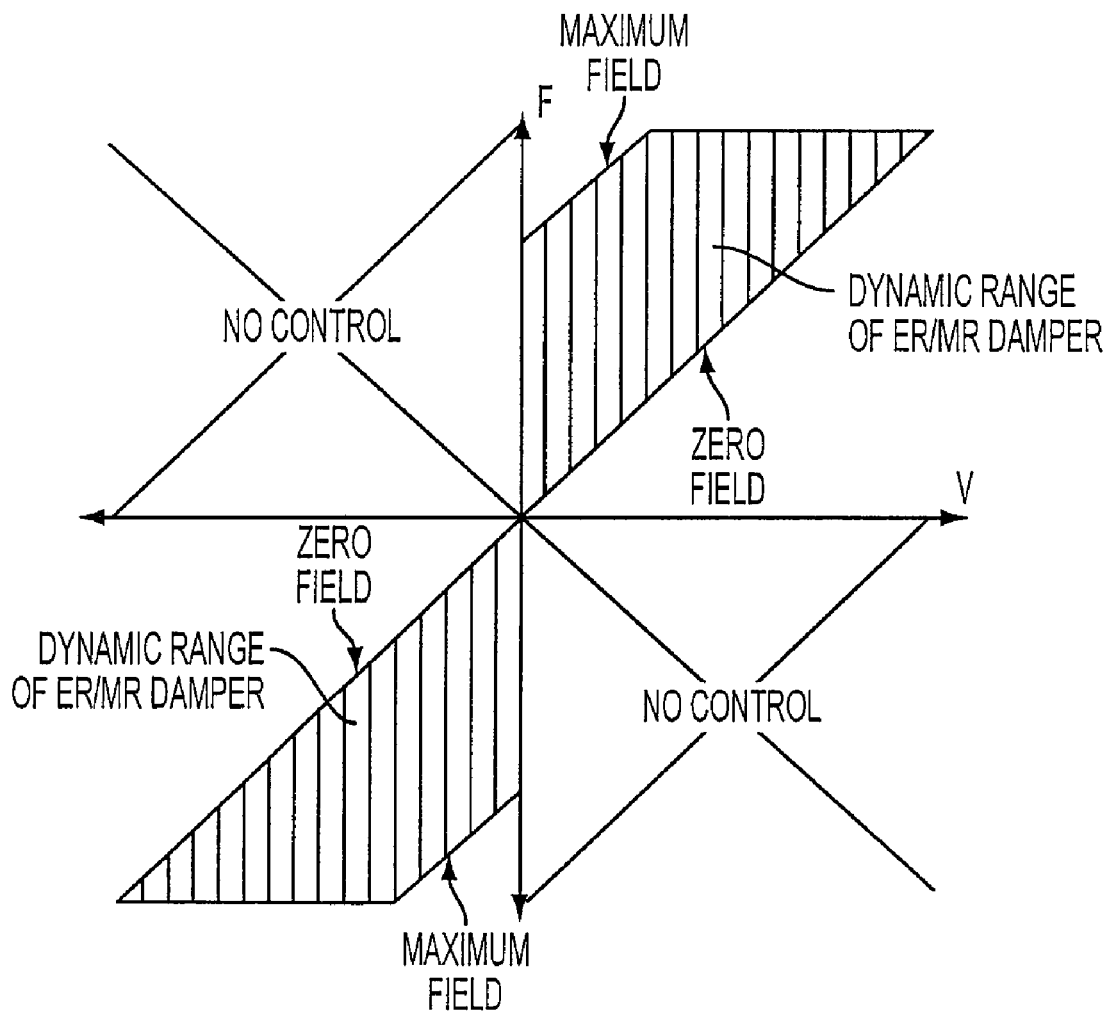
FIG. 5 is a graphical view of a dynamic range of an adjustable damper which may be controlled.

Like all semi-active devices, ER and MR dampers are purely dissipative. That is, there is only control authority when the desired force and the relative velocity are of the same sign. More specifically, ER and MR dampers have a dynamic range limited by the field-off and maximum field cases as shown in FIG. 5.

Based upon design considerations including, but not limited to, occupant weight range, design load levels, geometric restrictions, etc., one or more VPEAs 30 may be utilized in system 100, and their arrangement may vary. Multiple VPEAs 30 may be implemented in parallel, for instance, to increase the capacity. Using multiple VPEAs may also enable the use of smaller devices rather than one larger device. Additionally, arranging VPEAs in a diagonal configuration may be beneficial in maximizing stroke when vertical space is limited.

Fixed Profile Energy Absorber (FPEA).

In certain implementations, as recited above, system 100 may comprise one or more FPEAs 40 which may comprise, for example, a wire-bender, crushable column, inversion tube, tube and die, or other energy absorber, etc. FPEA 40 may be utilized (in certain implementations) as a supplement to VPEA 30. Should design load levels exceed the limitations of VPEA 30 or necessitate a design for VPEA 30 that may be geometrically unacceptable, one or more FPEAs 40 may be implemented. FPEA 40 may, for example, be implemented either in series or in parallel with VPEA 30. Since the use of an FPEA may decrease controllability (e.g., the amount of controllable force vs. uncontrollable force), the FPEA load profile should be chosen carefully to ensure that the system will be effective for design levels (occupant mass range, shock load levels, stroke distance, etc.).

Stiffness Element.

According to an aspect of the invention, system 100 may further comprise one or more stiffness elements 50. Examples of stiffness element 50 may include, but are not limited to, coil springs, leaf springs, visco-elastic material, etc.

Stiffness element 50, if used, may be implemented such that it provides a tuned stiffness for vibration control (preferably soft to reduce transmissibility). The tuning of this stiffness is important because its use may sacrifice some stroke of the energy absorber(s) during a shock event. Use of a variable stiffness spring (vs. fixed stiffness) may be advantageous because it would enable tuning to varying occupant masses. The variable stiffness spring may be adjusted by a manual control mechanism (e.g., a dial), or automatically adjusted based upon an occupant mass measurement.

According to an aspect of the invention, stiffness element 50 may be designed such that it provides stiffness during normal operation, but not during an extreme motion event (e.g., during a shock event). For example, stiffness element 50 may be positioned in series with an FPEA 40 (e.g., FIG. 6), and with low stiffness such that it bottoms out at FPEA load levels.

According to an aspect of the invention, stiffness element 50 may be positioned in parallel with VPEA 30 and/or FPEA 40 such that it breaks away at high load levels (e.g., via break-away fasteners, etc.). Designing stiffness element 50 without such a feature may be undesirable because stiffness element 50 may store energy rather than allowing an energy absorber (e.g., VPEA 30) to dissipate the energy as quickly as possible.

Alternative Configurations.

FIGS. 6-10 are exemplary illustrations of various design configurations for system 100. Note that for ease of illustration, one or more components of system 100 (e.g., controller 60, power source 90, weight indication mechanism 72, and one or more sensors (70a, 70b, . . . 70n)) have been omitted from these figures.

Figure 6:
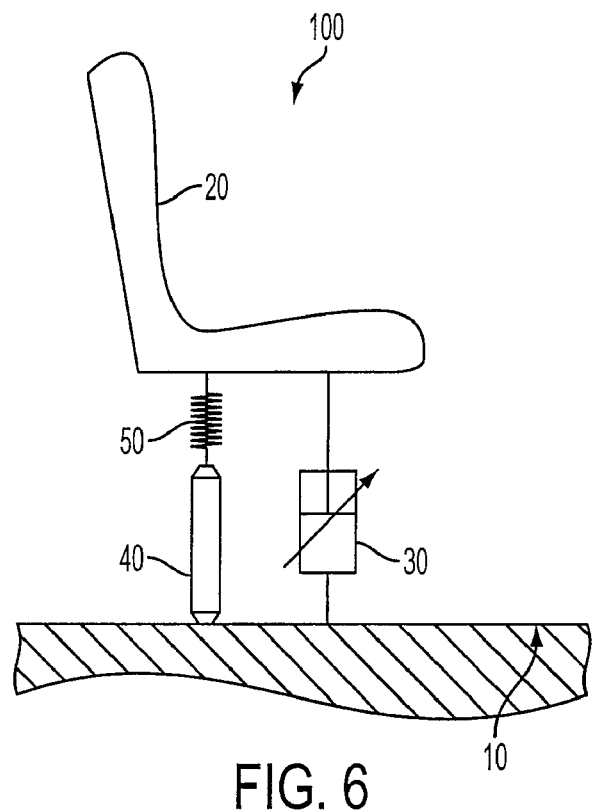
FIG. 6 is an exemplary illustration of an adaptive energy absorption system for a vehicle seat, according to an aspect of the invention.

FIGS. 1 & 6 each depict configurations in which stiffness element 50 is in series with FPEA 40, and both are in parallel with VPEA 30. In FIG. 1, FPEA 40 is depicted as a wire bender, while in FIG. 6, FPEA 40 is depicted as a crushable composite energy absorber. In these configurations, FPEA 40 may yield only during a shock event, and after stiffness element 50 has bottomed out. During the shock event, FPEA 40 may provide a fixed load-stroke profile, while VPEA 30 may automatically adjust to keep body load levels below required limits. Prior to the shock event, stiffness element 50 and VPEA 30 act to reduce occupant motion due to vehicle vibration.

Figure 7:
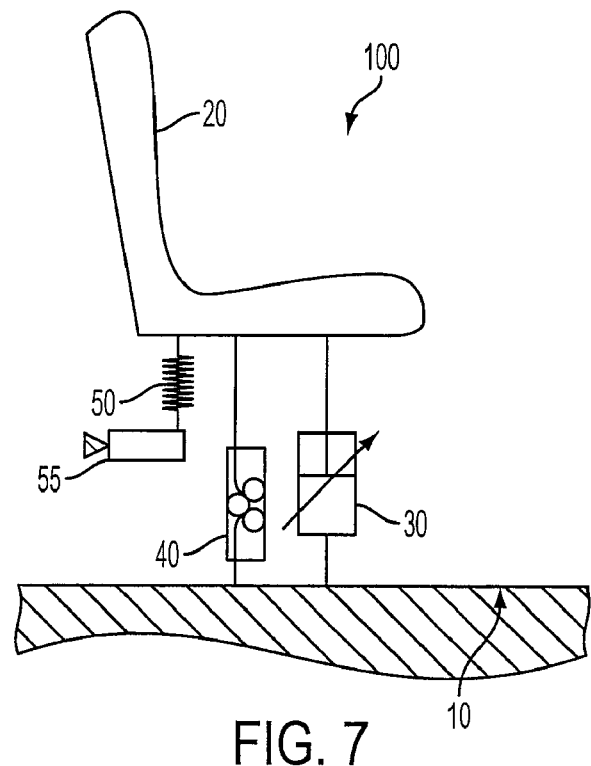
FIG. 7 is an exemplary illustration of an adaptive energy absorption system for a vehicle seat, according to an aspect of the invention.

As discussed above, stiffness element 50 may also be positioned in parallel with the energy absorbers as shown in FIG. 7. In this configuration, stiffness element 50 (e.g., the spring) is attached from vehicle seat 20 to base 10 (or some other foundation point on the vehicle) via one or more break-away device(s) 55. This enables the tuned spring to work to isolate vibration during normal operation. During a shock event, however, stiffness element 50 breaks away from the foundation and does not affect the shock control.

Figure 8:
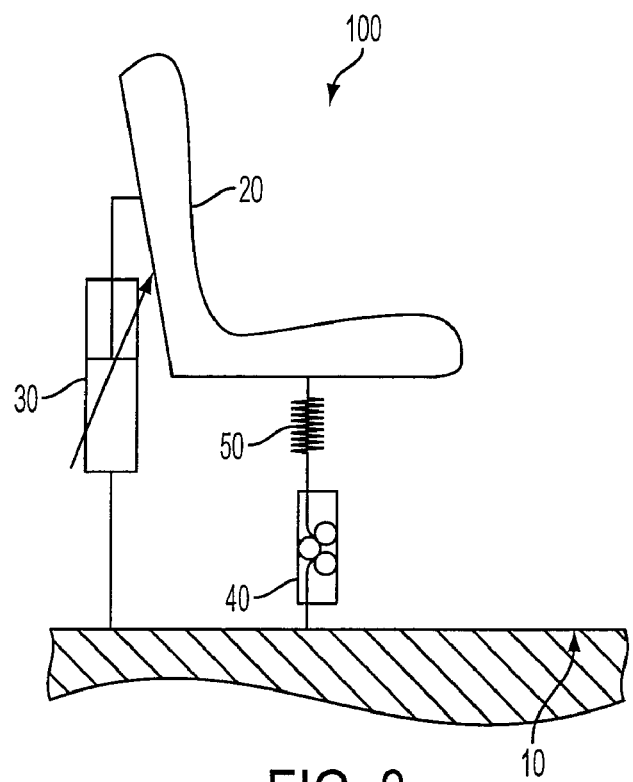
FIG. 8 is an exemplary illustration of an adaptive energy absorption system for a vehicle seat, according to an aspect of the invention.

It should be noted that all of these configurations are shown with the mechanical devices underneath vehicle seat 20 for ease of visualizing the mechanical system. The configurations of this invention, however, are not limited to the illustrated arrangements. The mechanical devices (such as the FPEAs, VPEAs, springs, etc.) may be arranged behind vehicle seat 20, to the sides of vehicle seat 20, above vehicle seat 20, etc., and may be configured to stroke in tension as well as compression in order to maximize damper stroke and/or to meet geometric requirements. FIG. 8 depicts an example of such an arrangement wherein VPEA 30 is positioned behind seat 20.

Figure 9:
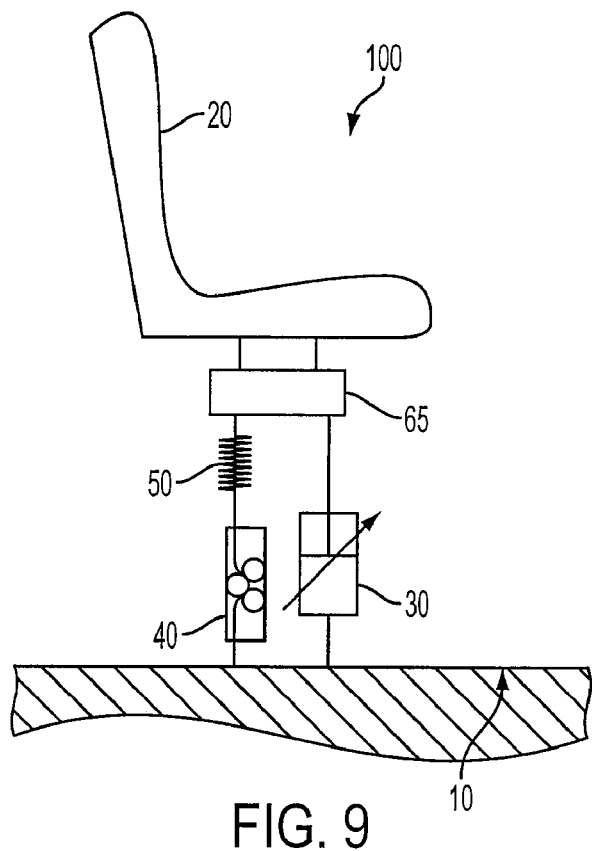
FIG. 9 is an exemplary illustration of an adaptive energy absorption system for a vehicle seat, according to an aspect of the invention.

In many instances, it is likely that a shock event will not be perfectly aligned with the vertical axis of vehicle seat 20. To account for this, a mechanical adapter 65 may be utilized that will convert lateral motion into purely vertical motion. This may be achieved by a mechanical linkage, etc. Utilizing such an adapter 65 (as shown in FIG. 9, for example) may be beneficial for practical use.

Figure 10:
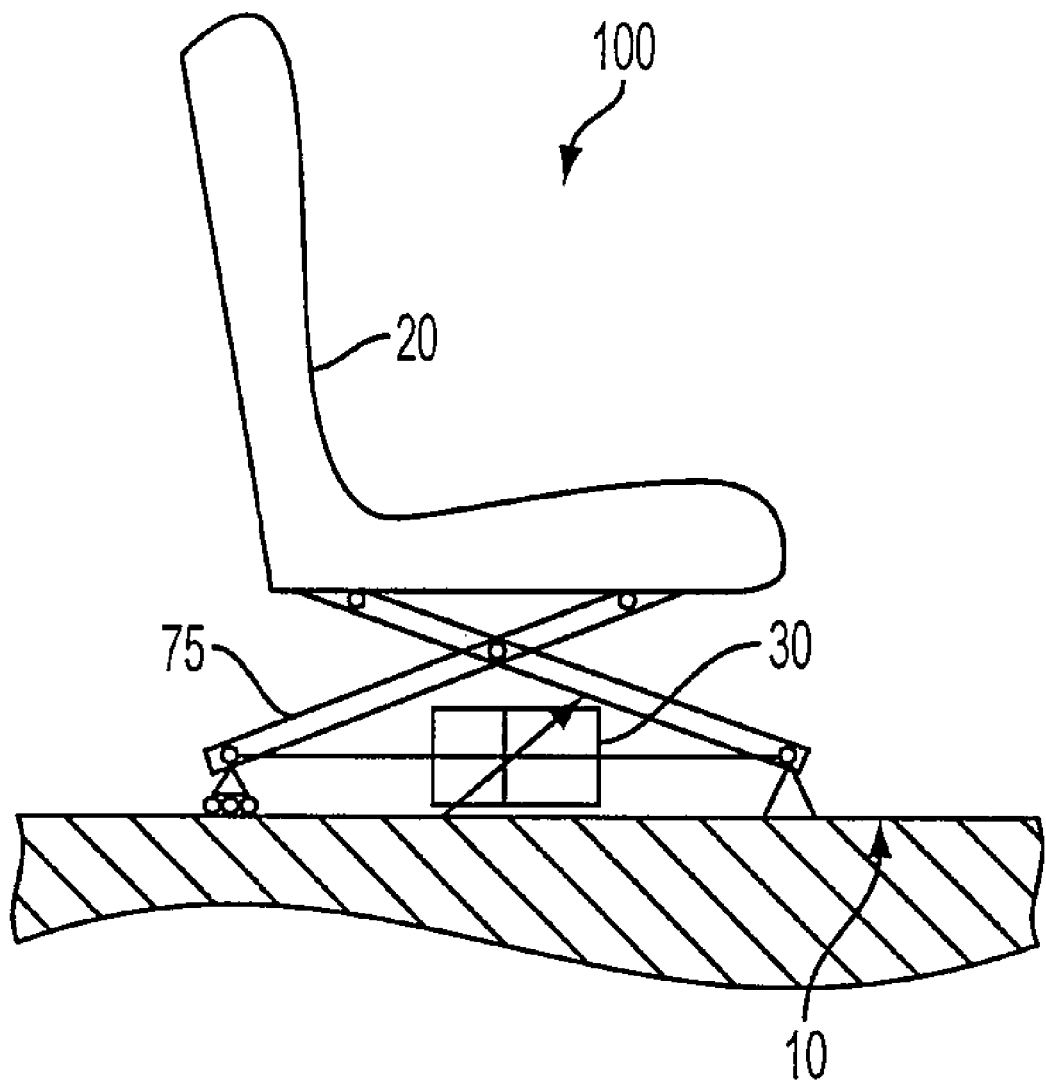
FIG. 10 is an exemplary illustration of an adaptive energy absorption system for a vehicle seat, according to an aspect of the invention.

Furthermore, such a mechanical adapter may also be used in situations where, due to geometric restrictions, for example, the energy absorbers may not be oriented vertically. In such a case, adapter may be used to transmit the vertical motion into motion in the direction of action of the energy absorber(s) (e.g., horizontal, diagonal, etc.). An example of such a mechanical adapter/arrangement 75 is shown in FIG. 10.

Dual-Goal Energy Absorption Apparatus.

According to an aspect of the invention, a dual-goal energy absorption apparatus (or device) may be utilized to mitigate both vibrations due to normal vehicle operation, as well as shock during a vehicle shock event (or other extreme motion event). Most energy absorbing devices for vehicle seat shock mitigation are rigid during normal operation and only stroke during an extreme motion event. In these instances, there is no vibration mitigation capability and the vehicle seat vibrates at the same magnitude, if not higher, than the (vehicle) floor input.

With a continuously controllable VPEA (such as, for example, an MR damper), the vehicle seat resonance may be designed to be much lower than the excitation input, thereby attaining vibration isolation. The VPEA may then be controlled to actively or semi-actively reduce resonance while maintaining high frequency isolation. Once an extreme motion event is experienced, the VPEA may be optimally controlled to keep body loads below injury thresholds while safely utilizing available stroke. Accordingly, configurations of dual-goal energy absorption apparatuses that provide a removable stiffness element, and improved force capability will be described in detail herein. As previously recited, although the dual-goal energy absorption apparatuses are described herein in the context of an adaptive energy absorption system for a vehicle seat, it should be recognized that they may be utilized in a variety of other applications without limitation. Accordingly, the following text and accompanying drawing figures should not be viewed as limiting.

With reference to FIG. 1, and as previously recited, for vibration isolation, it may be necessary to introduce a stiffness element (e.g., stiffness element 50) into system 100 to reduce the system fundamental resonance and to rebound VPEA 30. In shock mitigation design, however, as mentioned above, a stiffness element is undesirable because it stores energy and provides a potentially injurious or even lethal rebound reaction into the occupant of vehicle seat 20. To this end, disclosed herein are configurations of energy absorbers that provide suitable stiffness for vibration isolation, whereas, in extreme motion events, this stiffness is removed.

One design aspect that is related to this issue is a device's ability to account for rod volume as the device strokes. For example, for a typical hydraulic shock absorber or fluid damper, the volume inside the cylinder changes as the piston rod strokes in and out of the cylinder. This change in rod volume can create a vacuum when pulling, and prevent compression of the energy absorber (since the fluid is not compressible). Two exemplary implementations for correcting this issue are described below.

Figure 11A:
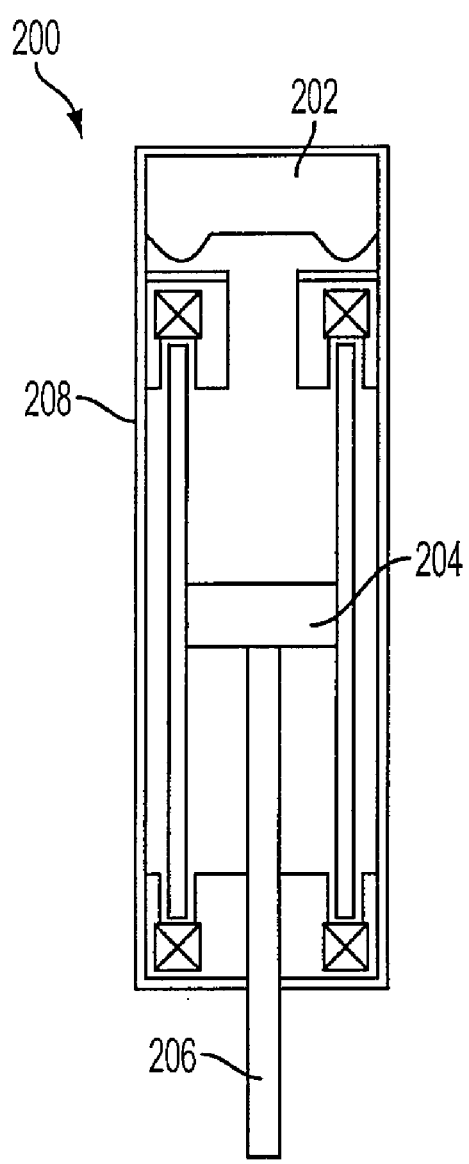
FIG. 11A is an exemplary illustration of a single rod actuator, according to an aspect of the invention.

First, as seen in FIG. 11A, a single-rod shock absorber 200 uses a gas-pressurized accumulator 202. In this case, as piston 204 strokes with rod 206, the rod volume inside cylinder 208 increases, and the gas inside accumulator 202 compresses to compensate. Compressing this gas, however, typically causes shock absorber 200 to provide stiffness/energy storage which may be undesirable for vehicle seat shock mitigation. Furthermore, the use of an accumulator 202 may add significant complexity and length to the VPEA design.

Figure 11B:
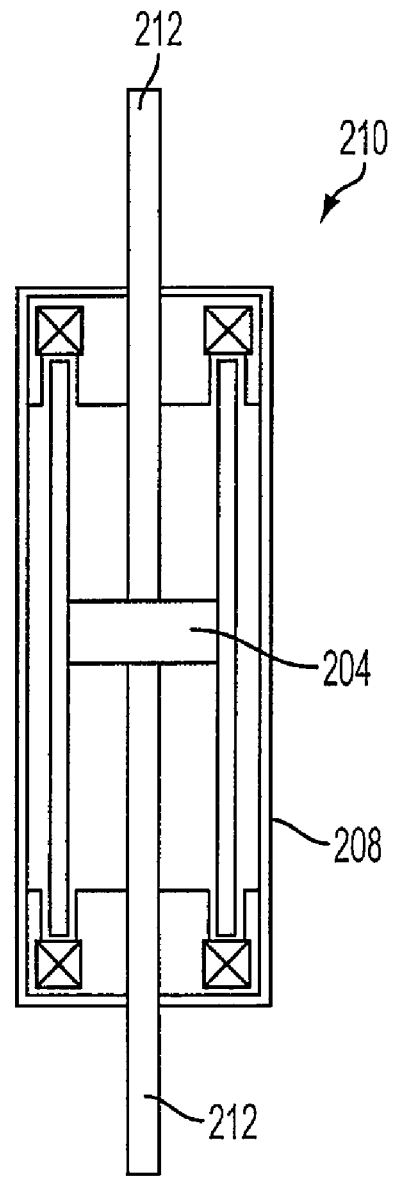
FIG. 11B is an exemplary illustration of a double rod actuator, according to an aspect of the invention.

Second, FIG. 11B depicts a double-rod shock absorber 210, wherein rod 212 extends from both ends of piston 204, and out of cylinder 208. As piston 204 compresses, the rod volume decreases on the high pressure side, but increases on the low pressure side, thus maintaining a constant volume system. This enables shock absorber 210 to stroke without adding stiffness/energy storage to the system. One issue associated with this configuration, however, is that when absorber 210 is compressed, rod 212 projects the full stroking length out the other end. This may, for instance, present mounting and space issues.

Figure 12:
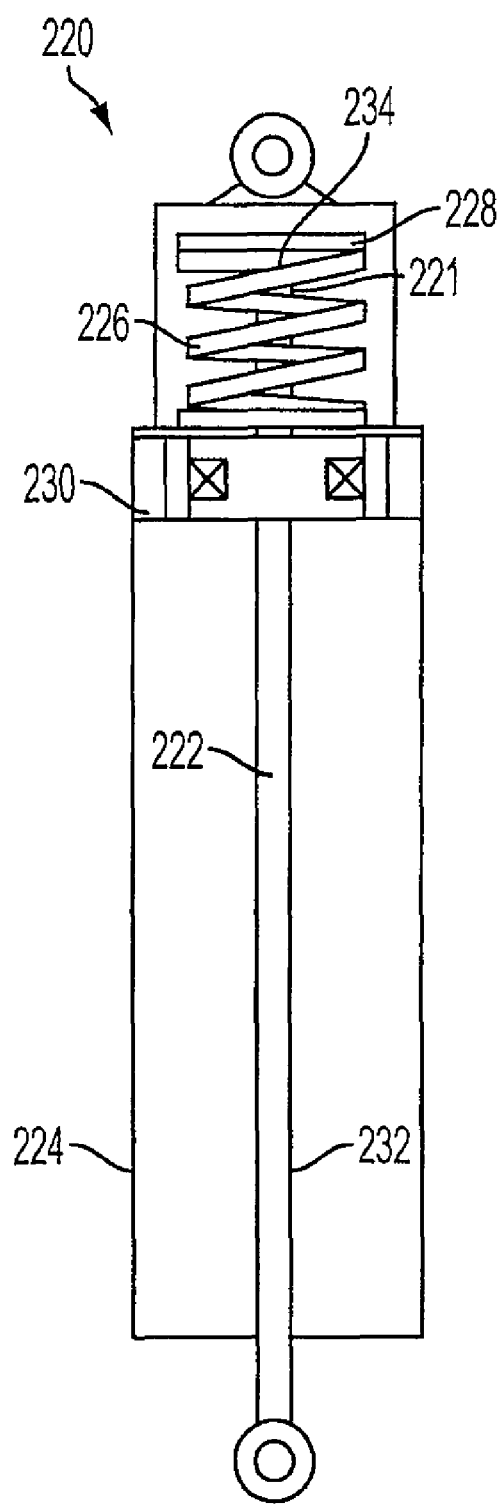
FIG. 12 is an exemplary illustration of a dual-goal energy absorption apparatus, according to an aspect of the invention.
Figure 13:
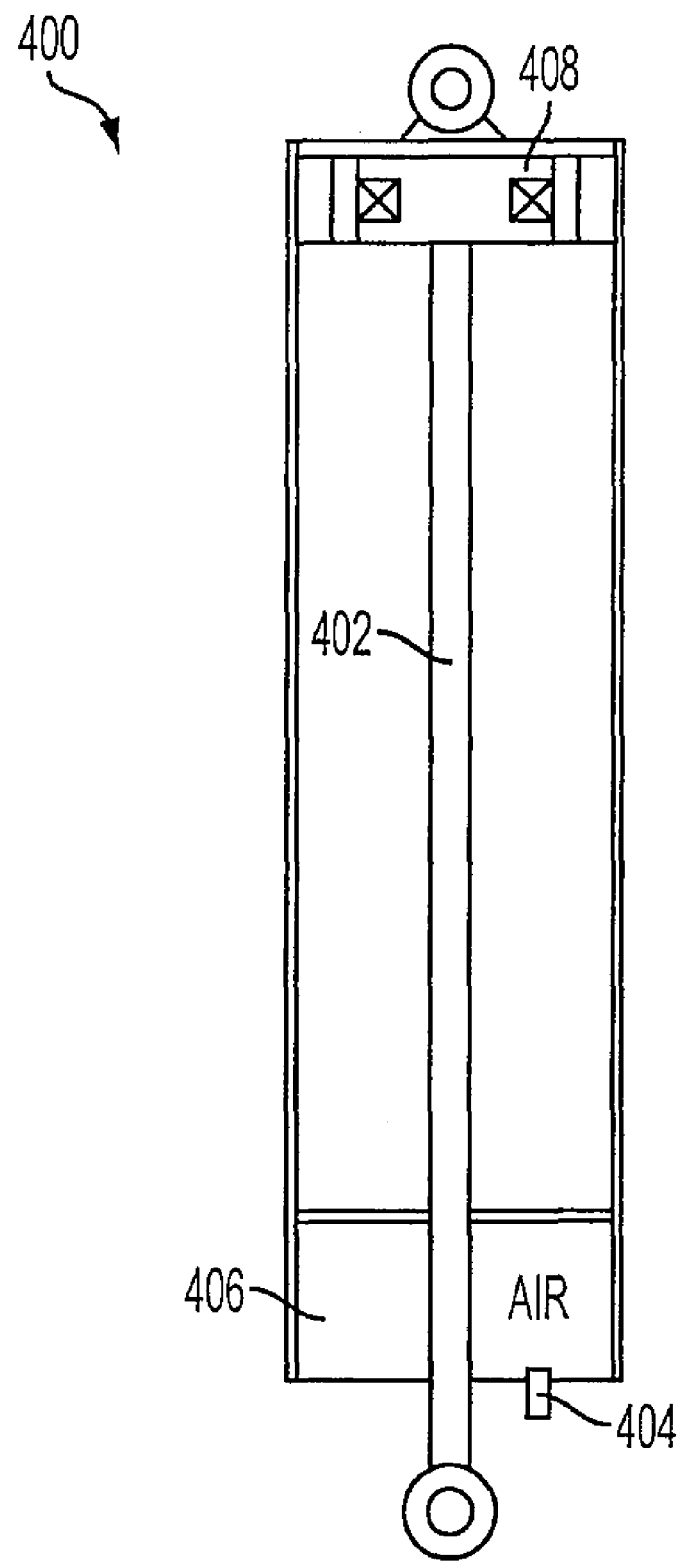
FIG. 13 is an exemplary illustration of a dual-goal energy absorption apparatus, according to an aspect of the invention.
Figure 14:
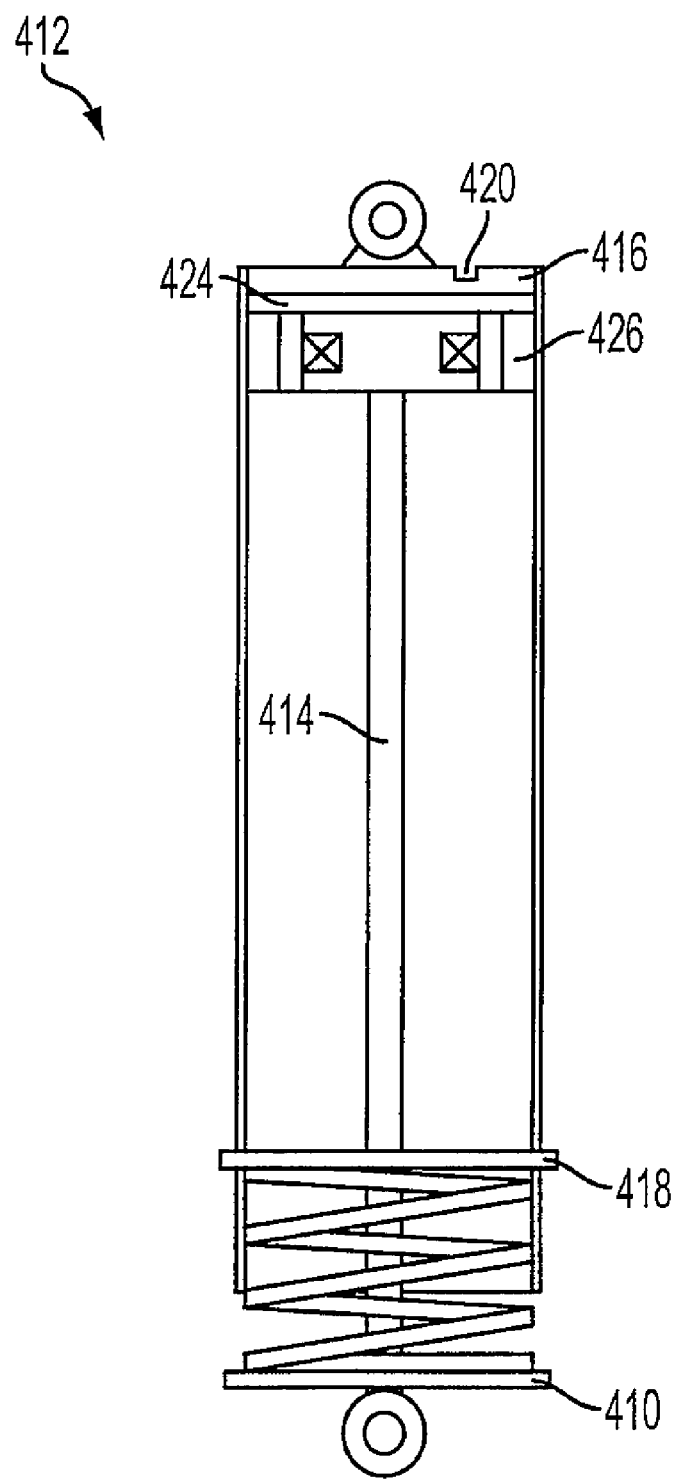
FIG. 14 is an exemplary illustration of a dual-goal energy absorption apparatus, according to an aspect of the invention.

Considering the aforementioned rod volume issue, three exemplary configurations for maintaining stiffness during vibration, and for removing it during a shock event (or other extreme motion event) are illustrated in FIGS. 12-14. While each of the configurations illustrated in FIGS. 12-14 depict a dual-goal energy absorption apparatus utilizing an MR damper, the concepts disclosed herein hold true for any energy absorbing device including a rod and piston (e.g., fluid dampers, valve-controlled dampers, etc.).

The first of these configurations (FIG. 12), depicts a dual-goal energy absorption apparatus 220 using a double-rod design, wherein a portion 221 of the rod 222 that is external to the cylinder 224 is attached to a spring 226 (or other stiffness element) via a break-away spring cap 228. Spring 226 provides stiffness during vibration but, when the force exceeds a predetermined threshold, spring-cap 228 breaks away and decouples spring 226 from rod 222 thus enabling rod 222 and piston 230 to travel freely without energy storage (stiffness).

In this configuration, when compressed, an external portion 221 (top) of rod 222 may be the same length as an internal portion 232 (bottom) of rod 222 so as to ensure that spring 226 will not pull through apparatus 220. Alternatively, external portion 221 (top) of rod 222 may be shorter, in which case rod end 234 will pull into cylinder 224, and the remaining change in rod volume will be made up by taking in air from the atmosphere. This may result in the need for apparatus 220 to be purged of air before it is used again. This is most likely an acceptable condition, however, since shock is typically a one-time event. One manifestation of such a design is shown in FIG. 15A.

Figure 15A:
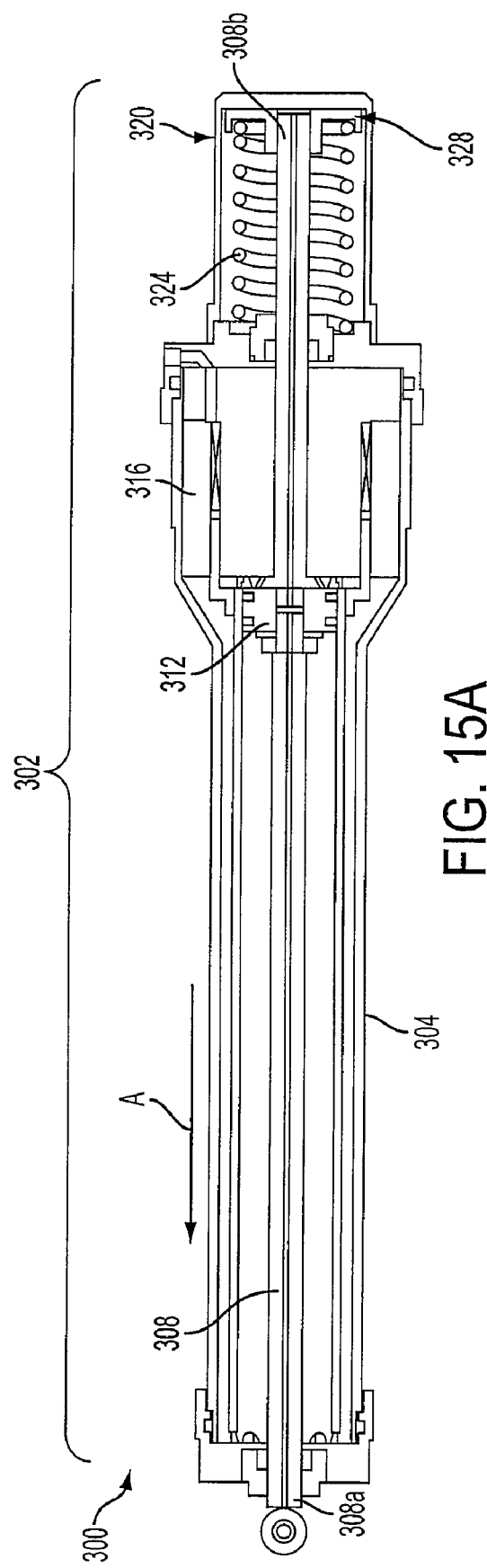
FIG. 15A is an exemplary illustration of a dual-goal energy absorption apparatus, according to an aspect of the invention.

FIG. 15A is an exemplary illustration of a dual-goal energy absorption apparatus 300 that comprises both a VPEA and a break-away stiffness element to provide both shock mitigation and vibration isolation. The VPEA may comprise an active valve damper, a magnetorheological (MR) fluid damper, an electroheological (ER) fluid damper, or other adjustable energy absorber. The stiffness element may comprise a coil spring, leaf spring, visco-elastic material, or other stiffness element.

According to an aspect of the invention, apparatus 300 comprises a cylinder assembly 302 including a cylindrical housing 304 and a stiffness element housing 320. A rod 308 is provided having a first end 308a external to cylindrical housing 304 and a second end 308b attached to a cap 328 that is disposed within stiffness element housing 320. A valve 316 (e.g., an MR valve) separates cylindrical housing 304 from stiffness element housing 320. The channel that appears on the outside of the cylinder that houses rod 308 and piston 312 is an MR fluid channel, as disclosed in U.S. Pat. No. 6,694, 856 to Peter Chen et al., which has been incorporated herein by reference in its entirety.

A piston 312 is coupled to rod 308 within cylindrical housing 304 at a predetermined position along the length of rod 308. A stiffness element 324 (e.g., a coil spring) is coupled to second end 308b of rod 308 at cap 328 via a coupling mechanism (e.g., a shear pin) (not illustrated) within stiffness element housing 320. Accordingly, stiffness element 324 provides resistance to piston 312 as piston 312 strokes in a first direction illustrated by arrow "A."

Since rod 308 extends outward (at first end 308a) external from cylindrical housing 304, and also protrudes into stiffness element housing 320, there is no change in rod volume as piston 312 strokes. In other words, as piston 312 strokes, the rod volume actually maintains constant because rod 308 is exiting and entering cylindrical housing 304 at the same time. As described in greater detail below, the coupling mechanism (e.g., the shear pin) may be designed to fail, decoupling stiffness element 324 from rod 308, when a force resulting from the motion of piston 308 in direction "A" exceeds a predetermined value.

The length of cylinder assembly 302, as well as that of cylindrical housing 304 and stiffness element housing 320 may vary depending on various design considerations. As such, the configuration depicted in FIG. 15A should not be viewed as limiting. Moreover, the position at which piston 312 is coupled to rod 308 within cylindrical housing 304 may also vary, along with the stiffness of stiffness element 324, based on design considerations.

Figure 16:
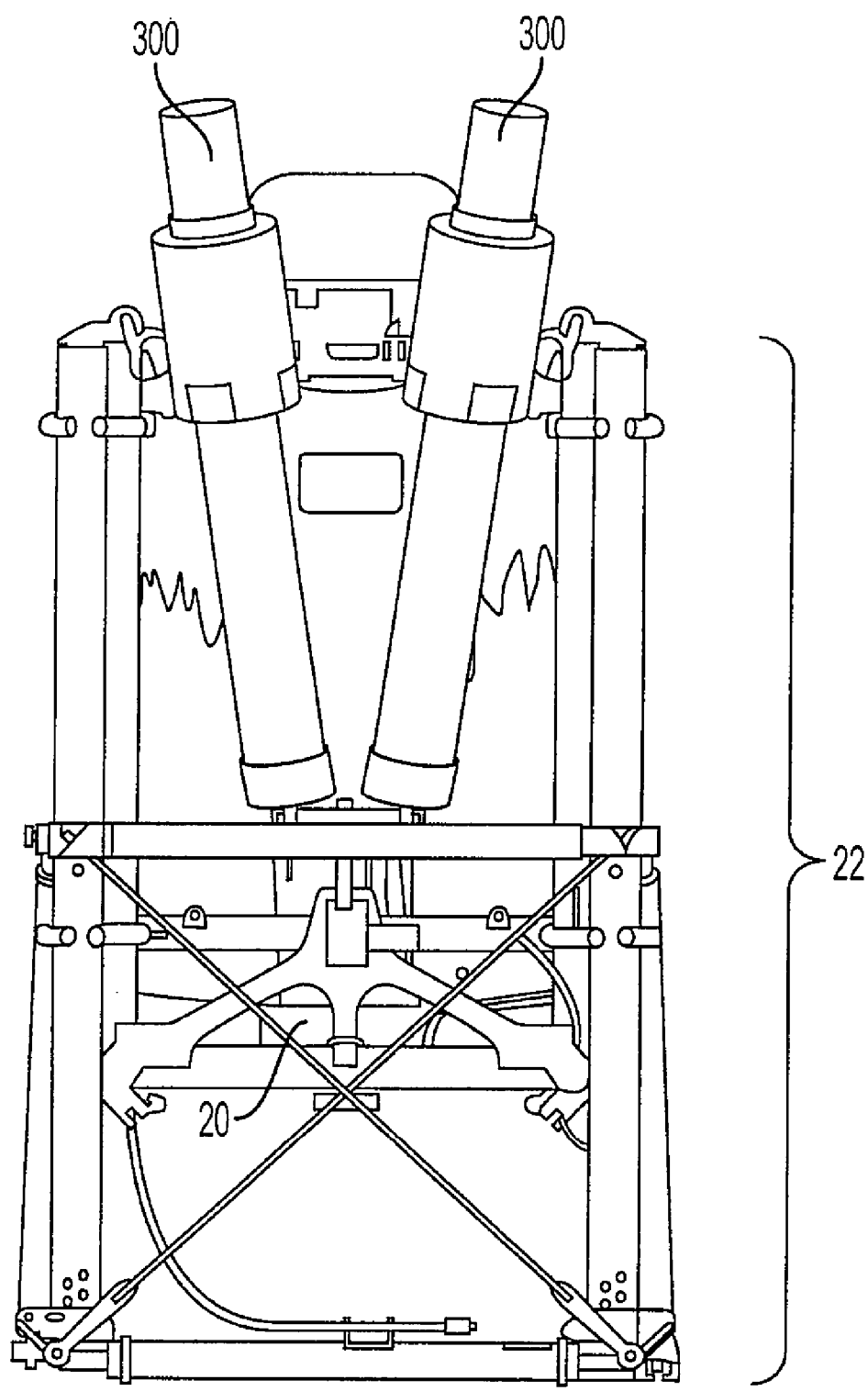
FIG. 16 is an exemplary illustration of a dual-goal energy absorption apparatus operatively connected to a vehicle seat assembly, according to an aspect of the invention.

According to an aspect of the invention, when used in system 100, apparatus 300 may be positioned vertically with valve 316 positioned at the top when apparatus 300 is operatively coupled to vehicle seat 20. In one exemplary implementation, as illustrated in FIG. 16, the top (spring end) of apparatus 300 may be attached to a fixed structure (e.g., a column). The fixed structure may be associated with vehicle seat 20 itself, or with an overall seat assembly 22 of vehicle seat 20. The bottom of apparatus 300 may be attached to a stroking portion of vehicle seat 20 itself, or with a stroking portion of overall seat assembly 22 of vehicle seat 20. Positioning apparatus 300 in this manner is advantageous in that it reduces (or avoids) sedimentation of MR fluid, for example, near valve 316. MR fluid can sediment, for example, if a damper is not used for an extended period of time. Sedimentation near an MR valve can cause locking of a damper which is disadvantageous.

Referring back to FIG. 15A, in operation, stiffness element 324 compresses a predetermined distance (e.g., approximately one inch) when an occupant sits in vehicle seat 20, extending rod 308 (and piston 312) in the direction of arrow "A." Thus, as vehicle seat 20 strokes downward, apparatus 300 is put in tension and extends. Dual-goal energy absorption apparatus 300 can now stroke a predetermined distance, e.g., ±1 inch (±1 g), to isolate vibration, with stiffness element acting to rebound the VPEA (e.g., the MR damper). Once a vehicle shock event (or other extreme motion event) is experienced (e.g., an acceleration >5 g), force reacted by the VPEA exceeds a predetermined value, causing the coupling mechanism (e.g., the shear pin) to fail. This results in the decoupling of stiffness element 324 from the piston 312/rod 308 motion. Piston 312 is then able to travel the remaining length of cylindrical housing 304 without storing energy (only dissipating it). Stiffness element housing 320 is designed to capture stiffness element 324 (e.g., the coil spring) after the coupling mechanism is broken to prevent it from hitting the occupant, or from causing other damage.

Figure 15B:
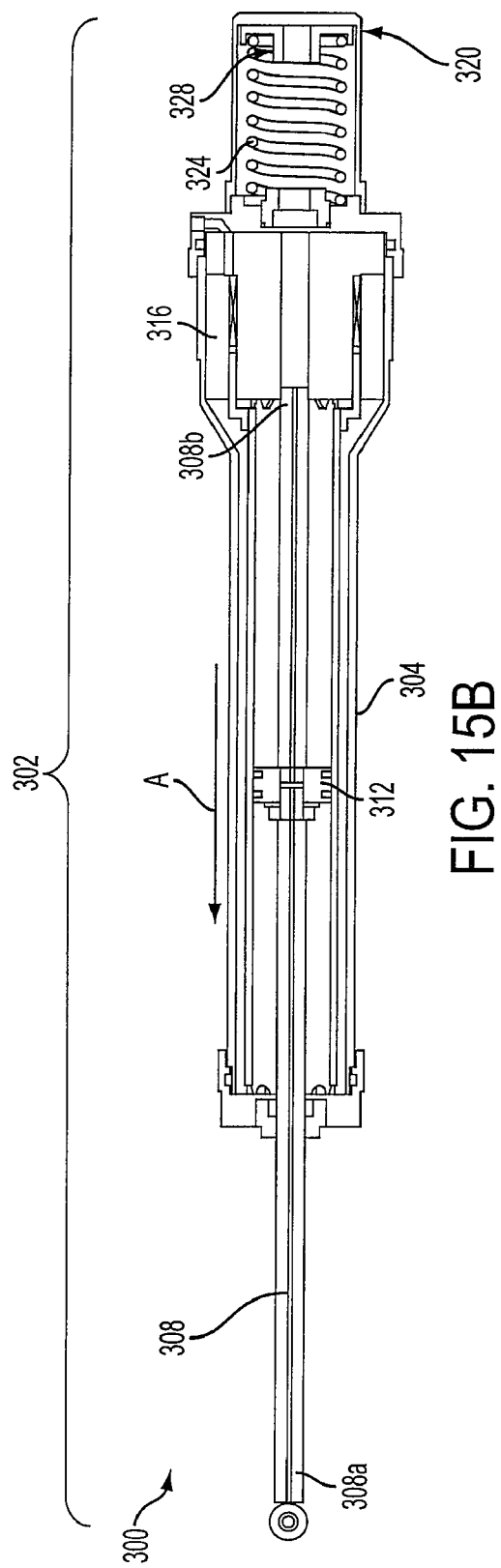
FIG. 15B is an exemplary illustration of a dual-goal energy absorption apparatus, according to an aspect of the invention.

In an exemplary illustration depicted in FIG. 15B, cap 328 completely breaks free of rod 308. Therefore, nothing prevents rod 308 from sliding through the valve and into cylindrical housing 304. If this happens, air is drawn in to make up for the volume change of rod 308. This drawing of air into apparatus 300 may be deemed acceptable for a one-time use, but, it may be necessary to evacuate the air from apparatus 300 before it is re-used. Alternatively, the second end 308b of rod 308 may be designed such that the piston reaches the end of the housing before clearing valve 316. This, however, would make the device longer and may lead to size and geometric shape issues for consideration.

Figure 17:
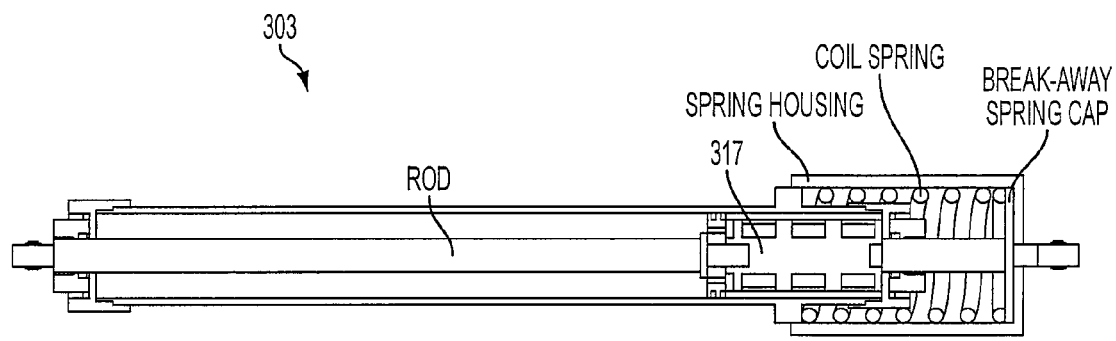
FIG. 17 is an exemplary illustration of a dual-goal energy absorption apparatus, according to an aspect of the invention.

The design in FIG. 15A uses a "bi-fold" MR valve wherein fluid is exchanged between an inner cylinder and an outer cylinder via a stationary MR valve, as opposed to a "standard" MR valve, wherein an MR valve 317 is integrated into a piston, as shown in FIG. 17. Except for MR valve 317 being integrated in the piston, the dual-goal energy absorption apparatus 303 of FIG. 17 is substantially identical to the dual-goal energy absorption apparatus 300 of FIG. 15A.

FIG. 13 depicts a second one of the configurations referenced above and, in particular, shows a dual-goal energy absorption apparatus 400 employing a single-rod 402 design, wherein a relief valve 404 is incorporated into a gas accumulator 406. In this implementation, gas accumulator 406 provides stiffness to rebound piston 408 during low amplitude vibration (low pressure). Once a shock event occurs, the resulting high pressure in accumulator 406 causes relief valve 404, which may be any appropriately designed relief valve, to open, thus, evacuating this compressed gas and relieving the associated stiffness.

Figure 18:
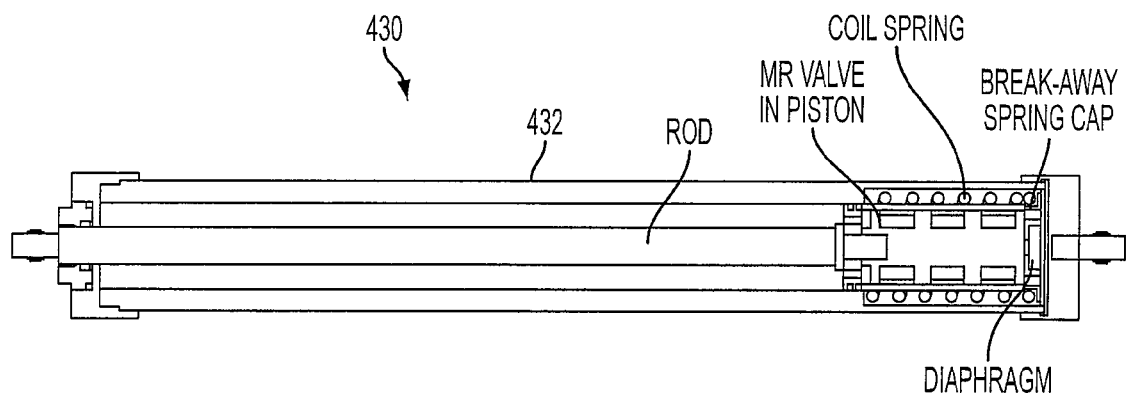
FIG. 18 is an exemplary illustration of a dual-goal energy absorption apparatus, according to an aspect of the invention.

FIG. 14 illustrates a third of the three previously-mentioned configurations and, in particular, depicts a dual-goal energy absorption apparatus 412 employing a single-rod 414 design that uses both an accumulator 416 and a break-away coil spring 418. In this implementation, accumulator 416 is open to the atmosphere at an opening 420 in cylinder 422, thus enabling cylinder 422 to take air in and push air out (as needed) to account for the changing rod volume within cylinder 422. In this instance, since there is no gas compression, there is no associated stiffness (except for a negligible amount resulting from the stretching of the diaphragm). Stiffness is provided substantially solely by a spring (e.g., coil spring 418) that will break away from rod 414 and decouple from the stroking piston 426. Furthermore, the use of a diaphragm 424 prevents the air drawn into apparatus 412 from mixing with the fluid such that the damper does not need to be purged of air after use. This design configuration may be implemented with spring 418 outside cylinder 422 as depicted in FIG. 14, or internal to a cylinder 432, as depicted in the dual-goal energy absorption apparatus 430 of FIG. 18. Such designs may utilize a variety of different valve types. For example, such designs may utilize bifold ER or MR valve dampers, as well as valve-controlled dampers.

An additional challenge associated with dual-goal energy absorption apparatuses relates to conflicting force requirements. For example, during force shock mitigation, high forces are required. For vibration isolation, however, a very low energy absorber force is desired when a device is in the "off" or lowest force state. This may be important, for instance, when the VPEA being used is a semi-active fluid damper such as a valve-controlled MR fluid damper or an ER fluid damper. For these dampers, the energy absorber force is either fully or partially comprised of a viscous damping force component.

For these dampers, the off-state damping ($F_o$) is a rate dependent force given by:

$$F_o = C_o v;$$

wherein $C_o$ is the viscous damping coefficient; and
v is the relative velocity between the seat and the base.
The viscous damping coefficient is given by:

$$C_o = 2\zeta\omega_n M;$$

wherein M is the suspended mass (seat+% of occupant);
$\omega_n$ is the system fundamental resonance; and
$\zeta$ is the viscous damping ratio.

Figure 19:
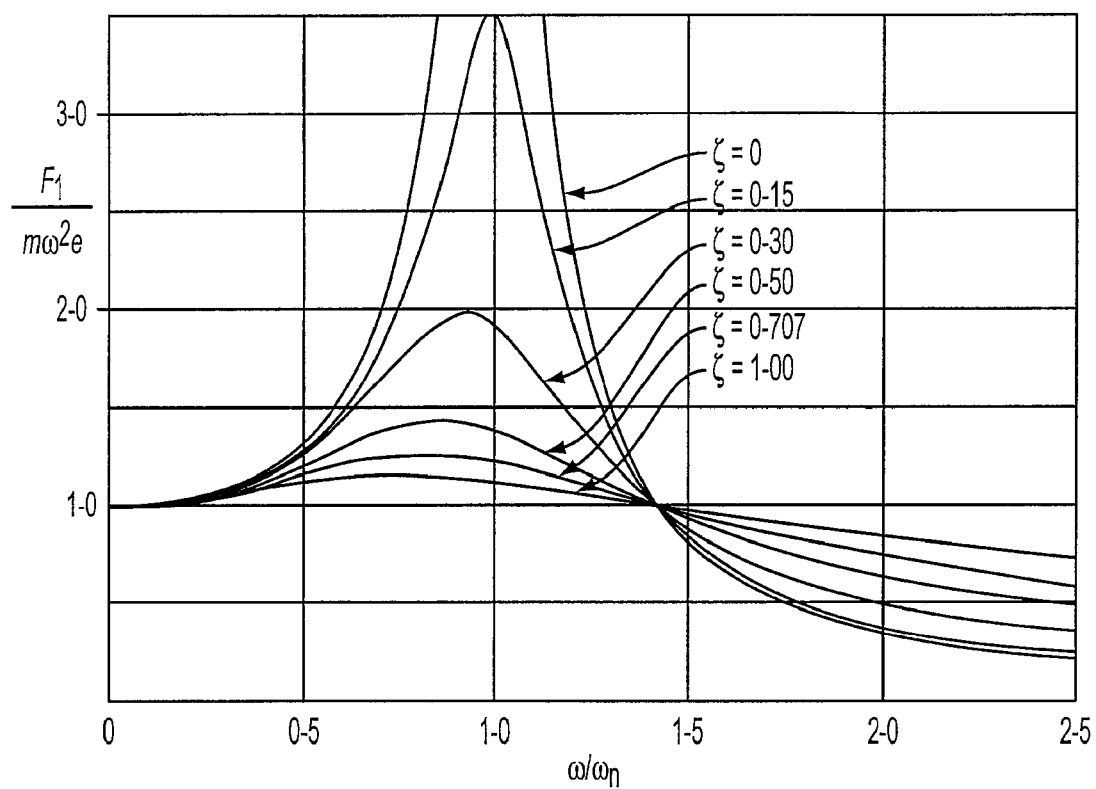
FIG. 19 illustrates a graph of the transmissibility for a single-degree-of-freedom (SDOF) system.

FIG. 19 illustrates the frequency response (acceleration output magnitude/acceleration input magnitude for varying input frequencies) for a simple single-degree-of-freedom (SDOF) system that may be used to represent a vehicle seat suspension. For vibration isolation, the fundamental resonance of a seat suspension system is typically tuned to be lower than the excitation frequencies. When tuned in this manner, the vibration of the seat (output) is less than the vibration of the base (input). Best performance is typically achieved when $\zeta$ is very small, meaning no viscous damping. As viscous damping is increased, high frequency isolation performance is degraded. Therefore, if a VPEA's off-state viscous damping component is very large, the vibration performance is limited.

In the case of a valve-controlled damper, the force dissipated may be completely due to viscous damping, where the size of the orifice is mechanically varied to change fluid flow restriction. To meet the high forces required for shock mitigation, the orifice should be made very small. Constraints on geometry, mass, time response, power consumption, etc., however, may limit the amount that the orifice may open for a given design. It may be very likely that, in order to meet the maximum force required for shock mitigation, the damper will also have a relatively high off-state (or valve fully open) viscous damping force level, leading to less desirable vibration performance.

For ER and MR fluid dampers, the force dissipated is a combination of a viscous damping component and an ER/MR component. Assuming the Bingham Plastic model for ER/MR fluid behavior, the total force is given by:

$$F_{tot} = C_o v + F_y \text{sign}(v);$$

wherein $F_y$ is the fluid yield force and sign represents the signum function.

For these dampers, constraints such as limitations of the ER/MR fluid properties, the associated electric/magnetic circuit as well as geometry and weight may limit the maximum achievable fluid yield force for a given design. In such cases, viscous damping may be used to supplement the ER/MR effect and attain the required maximum force values. Doing so, however, may leave the damper with a high off-state (field off) viscous damping force level, again leading to less desirable vibration performance.

Various dual-goal energy absorption apparatus configurations are disclosed herein that aim to, among other things, achieve better vibration isolation while maintaining the maximum required force for shock mitigation. One method of attaining these conflicting force requirements is to supplement the VPEA with a conventional fixed profile energy absorber (FPEA) such as a crushable column, tube and die energy absorber, inversion tube, wire bender, etc. By supplementing the VPEA with a FPEA, the VPEA may be sized to have a lower maximum force making it optimal for vibration. During shock, the FPEA adds to the VPEA force to reach the maximum force required for shock mitigation. For example, the FPEA may be added in parallel or in series.

Figure 20:
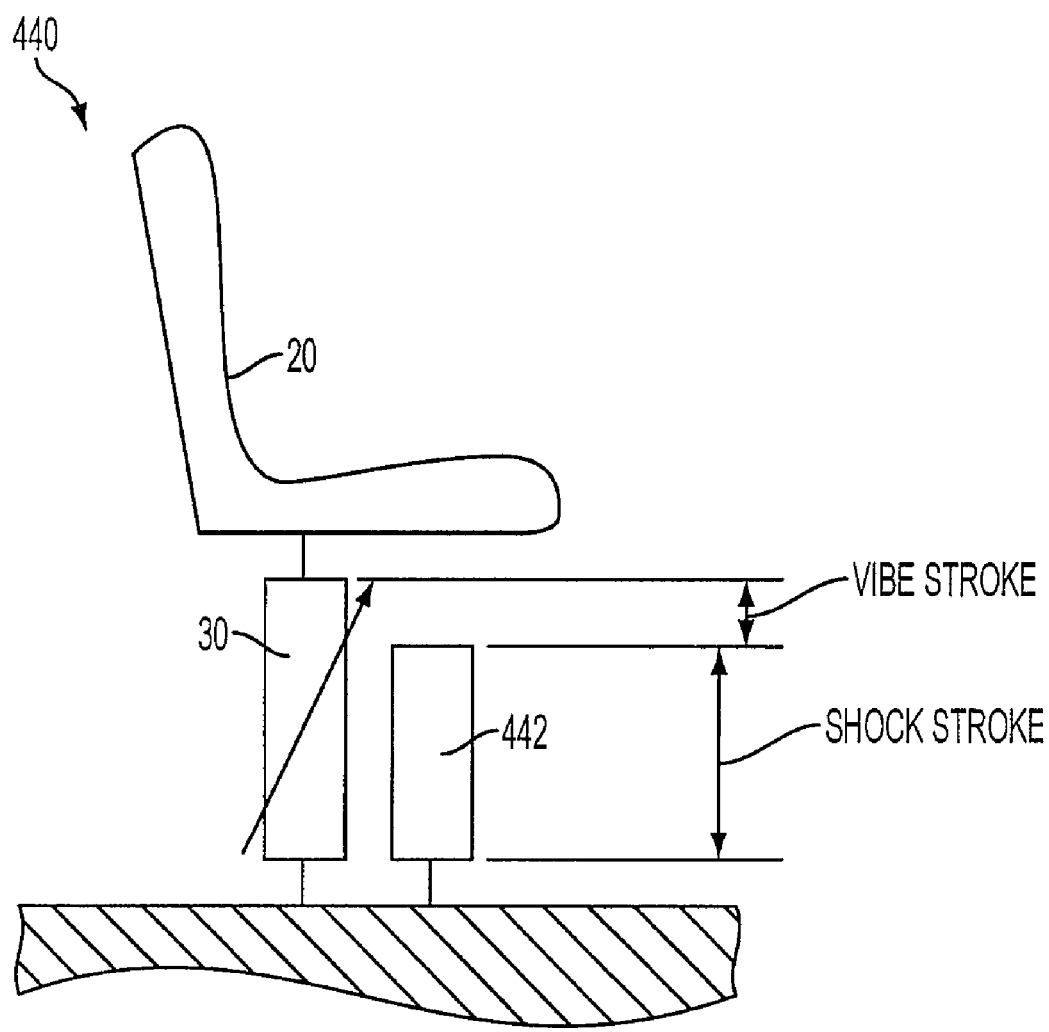
FIG. 20 is an exemplary illustration of an adaptive energy absorption system for a vehicle seat employing a fixed profile energy absorber (FPEA) and a variable profile energy absorber (VPEA) in a parallel configuration, according to an aspect of the invention.

FIG. 20 is an exemplary illustration of an adaptive energy absorption system 440 for vehicle seat 20. System 440 is an alternative design configuration of system 100 (FIG. 1), and comprises a FPEA 442 in parallel with VPEA 30. For ease of illustration, one or more components illustrated in FIG. 1 (e.g., controller 60, power source 90, weight indication mechanism 72, and one or more sensors (70a, 70b, . . . 70n)) have been omitted from this figure.

As shown in FIG. 20, VPEA 30 would act alone during vibration. Once a preset vibration stroke capability is exceeded during a shock (or other extreme motion) event, FPEA 442 is activated in parallel with VPEA 30 to increase force capability. Having VPEA 30 and FPEA 442 arranged in parallel enables system 440 to reach high force for shock mitigation while maintaining the low off-state viscous damping for vibration isolation. Furthermore, this arrangement also maintains some of the capability to adapt to occupant weight and varying shock levels.

A system such as that illustrated in FIG. 20 may have numerous configurations which selectively include various components, including those disclosed herein. For example, a stiffness element (not shown in FIG. 20) may be included as part of VPEA 30 (see, e.g., FIGS. 12, 14, 15, 17, and 18), or may be separate from VPEA 30 (see, e.g., FIGS. 1 and 6-9). Furthermore, while FIG. 20 depicts FPEA 442 and VPEA 30 as two separate devices, it may be advantageous to combine these into a single dual-goal energy absorption apparatus. FIGS. 21-24 depict but a few of the various configurations in which FPEAs 442 may be combined with VPEA 30.

Figure 21:
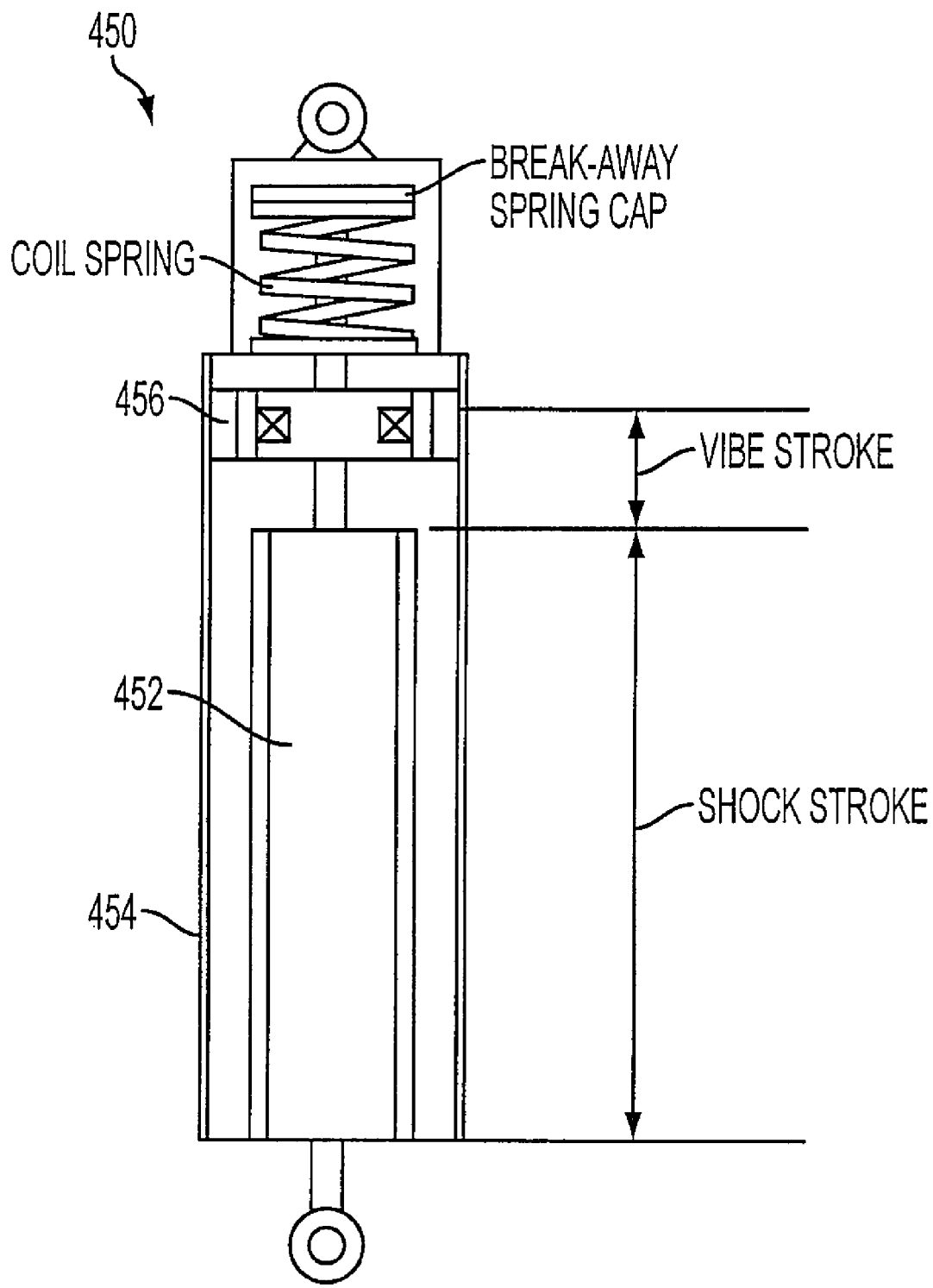
FIG. 21 is an exemplary illustration of a dual-goal energy absorption apparatus, according to an aspect of the invention.

FIG. 21, for example, illustrates a dual-goal energy absorption apparatus 450 comprising a crushable column 452 (such as a composite or honeycomb tube) placed inside an MR damper 454. During vibration, MR damper 454 acts alone to semi-actively isolate vibration. During a shock event, a piston 456 travels past a preset vibration stroke capability, and begins to bear down on crushable column 452. As it strokes during shock, the force to crush column 452 adds to the force of MR damper 454.

Figure 22:
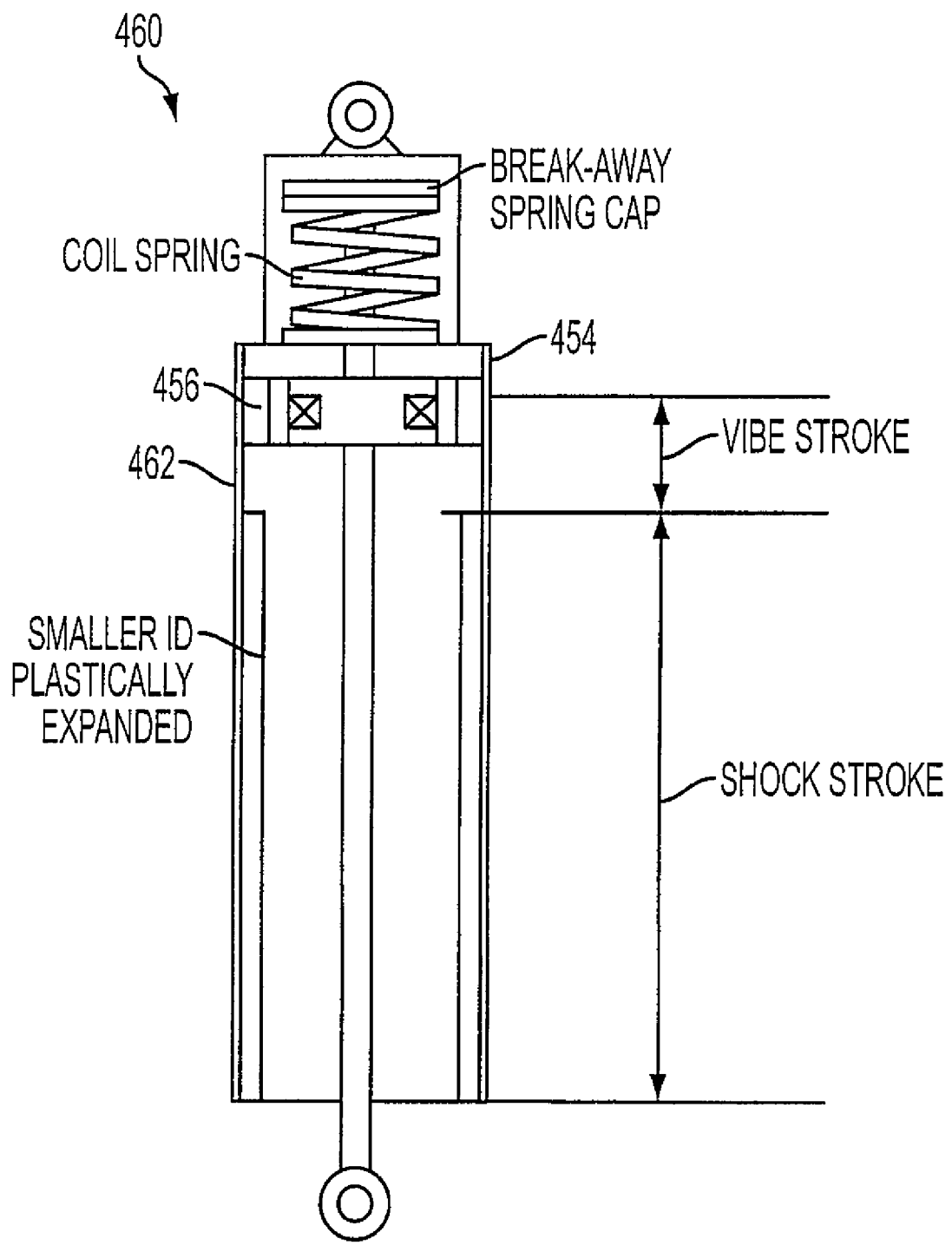
FIG. 22 is an exemplary illustration of a dual-goal energy absorption apparatus, according to an aspect of the invention.

FIG. 22 depicts a dual-goal energy absorption apparatus 460, wherein an MR damper 462 acts alone during vibration to semi-actively isolate vibration. During shock, piston 456 travels past a preset vibration stroke capability and reaches a portion of cylinder 462 in which the inner diameter is reduced. The force required to plastically deform (expand) cylinder 462 as piston 456 travels down the cylinder, and/or the friction force, then adds to the MR damper force.

Figure 23:
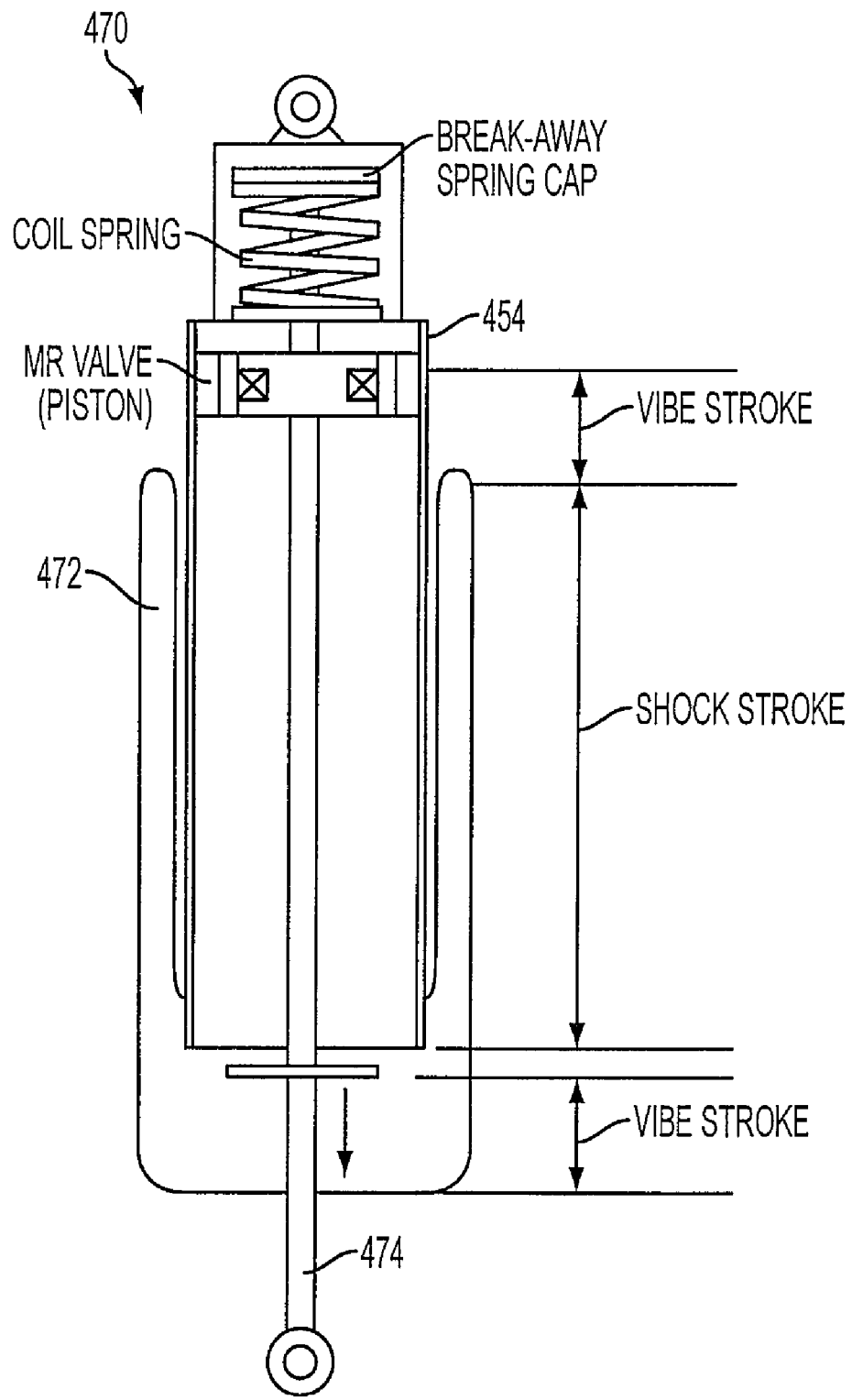
FIG. 23 is an exemplary illustration of a dual-goal energy absorption apparatus, according to an aspect of the invention.

FIG. 23 illustrates a dual-goal energy absorption apparatus 470 comprising an inversion tube 472 coupled in parallel with an MR damper 454. In this case, as rod 474 travels past a preset vibration stroke capability (where the MR damper acts alone), rod 474 bears down on a portion of inversion tube 472, which causes plastic deformation (inversion of the metal extrusion) which adds force to MR damper 454.

Figure 24:
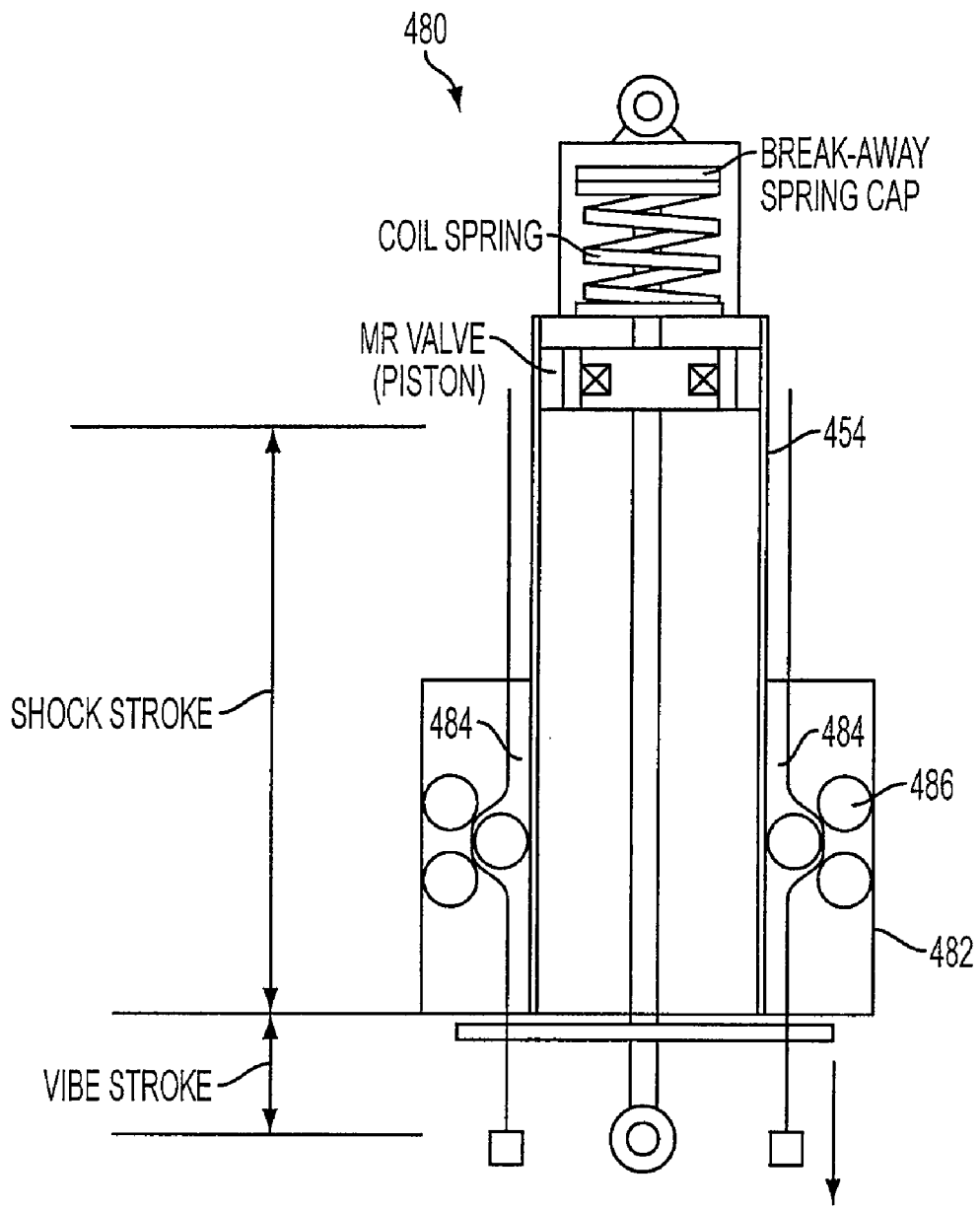
FIG. 24 is an exemplary illustration of a dual-goal energy absorption apparatus, according to an aspect of the invention.

FIG. 24 depicts a dual-goal energy absorption apparatus 480 wherein one or more wire bender energy absorbers 482 may be coupled in parallel with an MR damper 454. In this configuration, as rod 474 travels past a preset vibration stroke capability (where MR damper 454 acts alone), the rod 474 begins to pull on the wires 484, and force them through bending rollers 486 attached to the body of the MR damper 454. The force required to plastically deform wire(s) 484 adds to the MR energy absorber force to meet the maximum force required for shock mitigation.

Although the VPEA is depicted as an MR damper in FIGS. 21-24 (e.g., MR damper 454), any type of VPEA using a rod and/or piston may be implemented. Additionally, while FIGS. 21-24 also depict a break-away coil spring to add stiffness during vibration similar to that disclosed in other configurations herein, any number of other stiffness elements may be used including, but not limited to, any of the stiffness elements disclosed herein. Additional configurations may also be implemented including, but not limited to, removing the spring (or stiffness element) from any of the dual-goal energy absorption apparatuses illustrated in FIGS. 21-24, leaving only the VPEA and the FPEA. Other configurations may be implemented.

Figure 25:
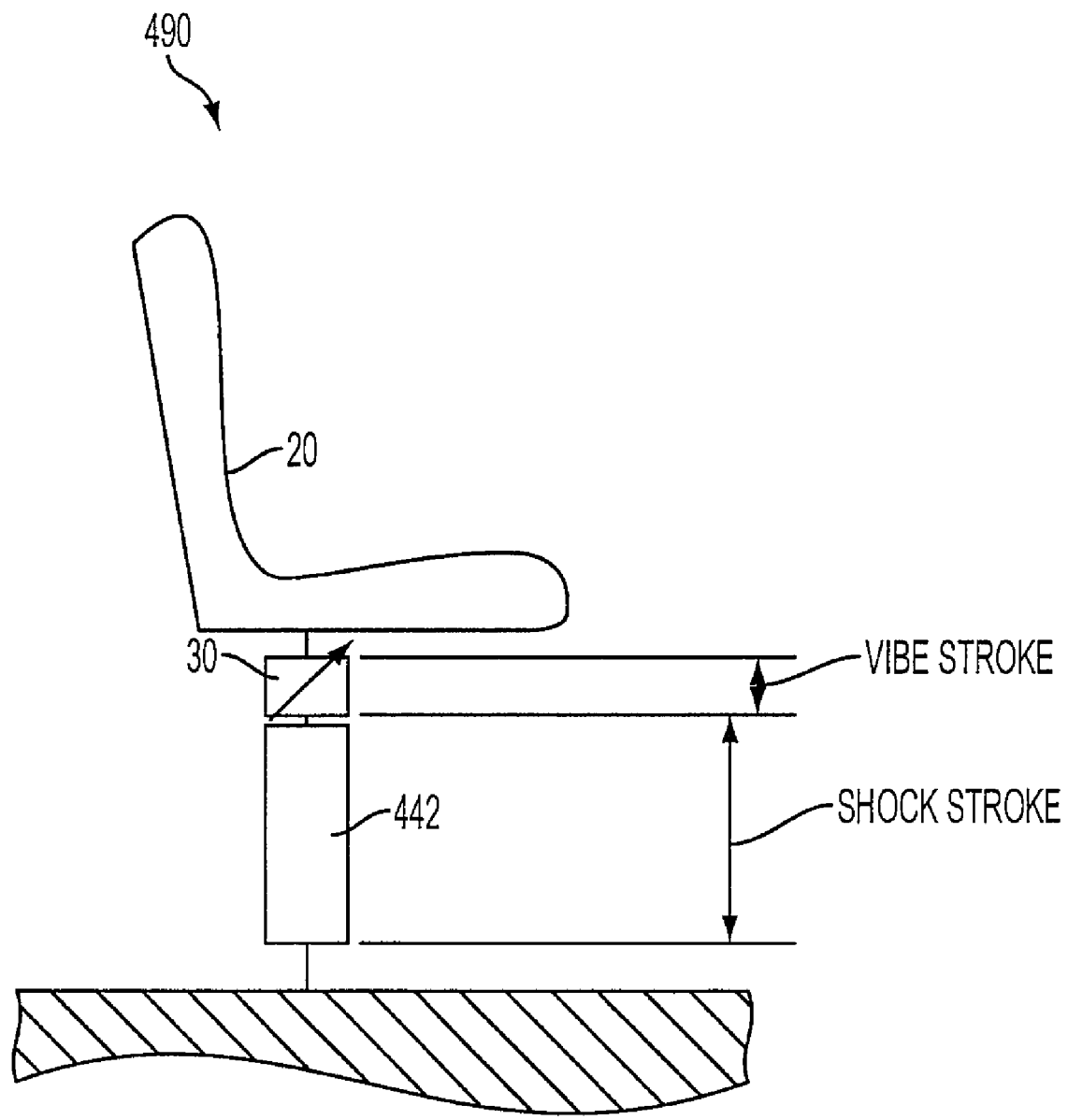
FIG. 25 is an exemplary illustration of an adaptive energy absorption system for a vehicle seat employing a fixed profile energy absorber (FPEA) and a variable profile energy absorber (VPEA) in series, according to an aspect of the invention.

FIG. 25 is an exemplary illustration of an adaptive energy absorption system 490 for vehicle seat 20. System 490 is an alternative design configuration of system 100 (FIG. 1), and comprises a FPEA 442 in series with VPEA 30. For ease of illustration, one or more components illustrated in FIG. 1 (e.g., controller 60, power source 90, weight indication mechanism 72, and one or more sensors (70a, 70b, . . . 70n)) have been omitted from this figure.

Figure 26:
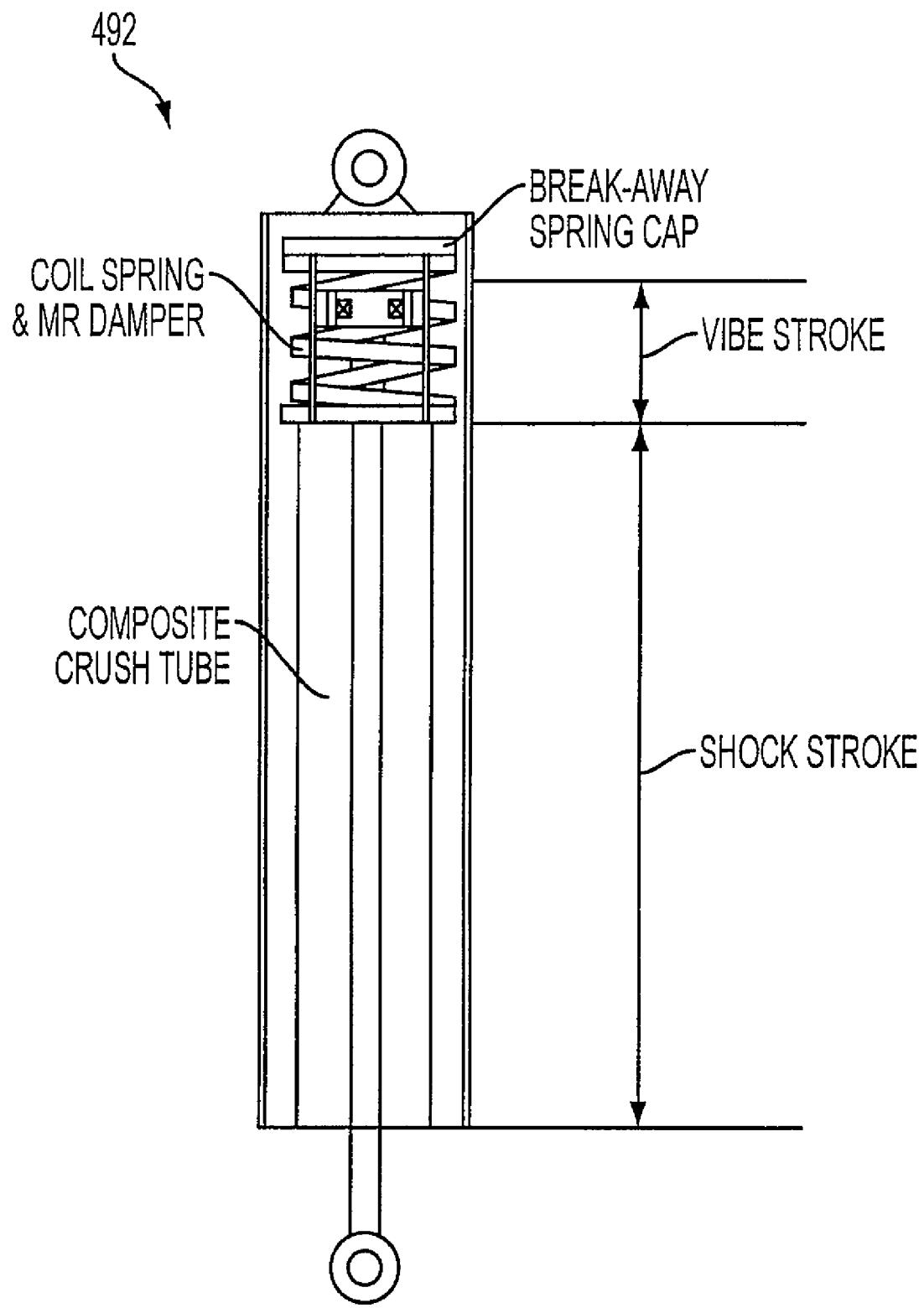
FIG. 26 is an exemplary illustration of a dual-goal energy absorption apparatus, according to an aspect of the invention.

In the configuration depicted in FIG. 25, VPEA 30 may be designed solely for vibration isolation (both in force and stroke requirements). During a shock event, the stroke of VPEA 30 is quickly expended, and then FPEA 442 is activated. In this configuration, only FPEA 442 provides force during a shock event. Therefore, this configuration sacrifices adaptability during crashworthiness. This configuration may be implemented using separate VPEA 30 and FPEA 442 devices (as shown in FIG. 25) or combined into a single dual-goal energy absorption apparatus 492 (as shown in FIG. 26). Once again, while FIG. 26 depicts VPEA 30 as an MR damper, any type of VPEA may be utilized. Furthermore, while the stiffness element shown in FIG. 26 is a break-away coil spring 494, this spring could be replaced with any number of stiffness elements including, but not limited to, any of the stiffness elements disclosed herein. Further, coil spring 494 may, for example, be removed from apparatus 492 entirely, or be attached to vehicle seat 20 separately.

Another manner of providing supplemental force to ER & MR dampers during shock is to provide a supplemental valve that is only utilized during shock. In such a configuration, one MR valve (primary) is designed for optimized vibration isolation and may be used alone during low amplitude vibration excitation, while a second MR valve is designed to provide the supplementary force required to mitigate shock and may thus be only utilized during a shock event. Two exemplary configurations of such a design are illustrated in FIGS. 27 and 28.

Figure 27:
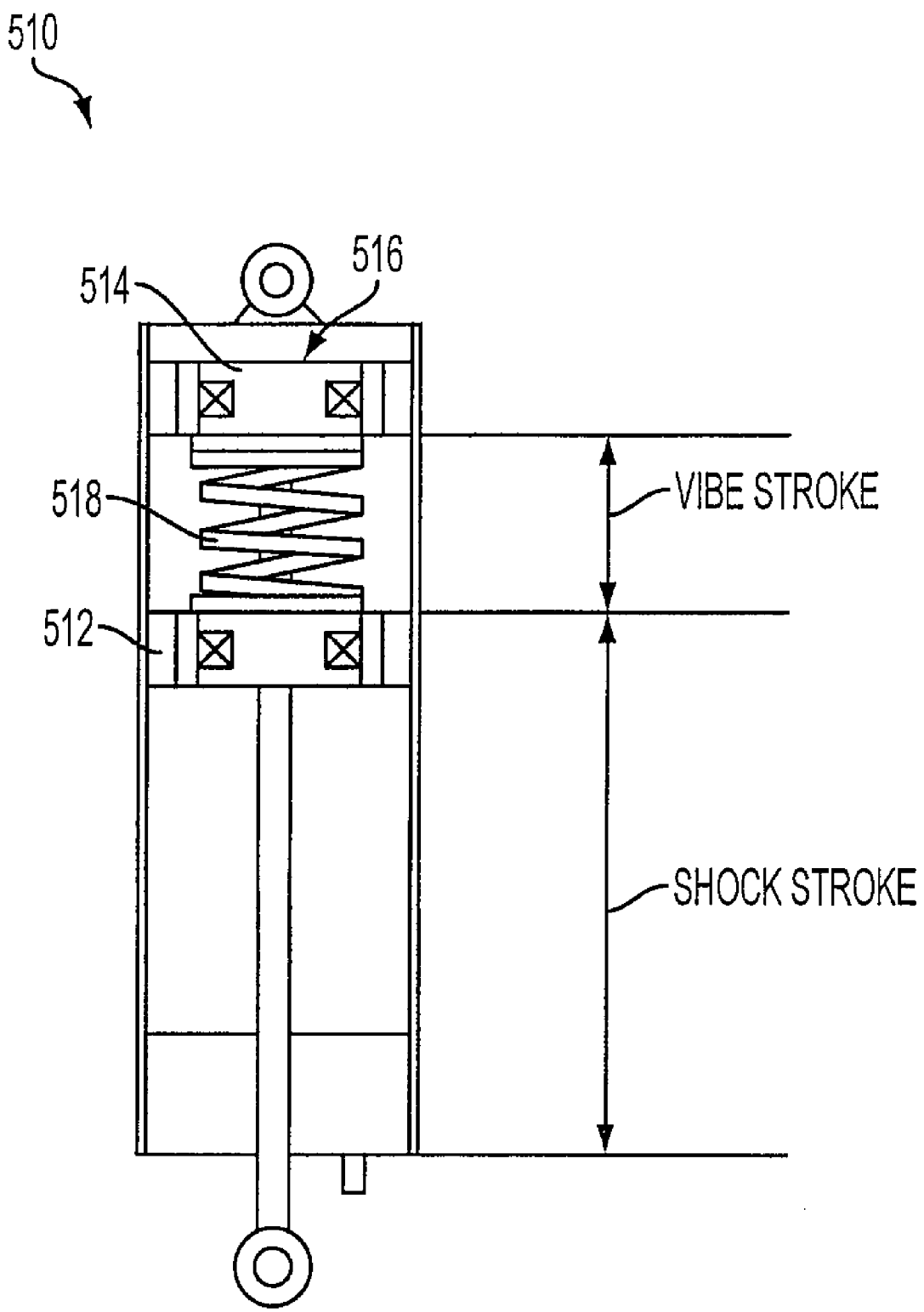
FIG. 27 is an exemplary illustration of a dual-goal energy absorption apparatus, according to an aspect of the invention.

In the dual-goal energy absorption apparatus 510 of FIG. 27, a lower (or primary) MR valve 512 moves during vibration only, while the upper (or supplementary) MR valve 514 is fixed within apparatus 510 by a breakaway mechanism 516. MR valves 512 and 514 may be connected with a stiffness element (e.g., coil spring 518) which provides the necessary tuned stiffness for vibration isolation. During a shock event, the force reacted through coil spring 518 and onto supplementary MR valve 514 exceeds a predetermined breakaway force, causing supplementary MR valve 514 to stroke—increasing the total force.

Figure 28:
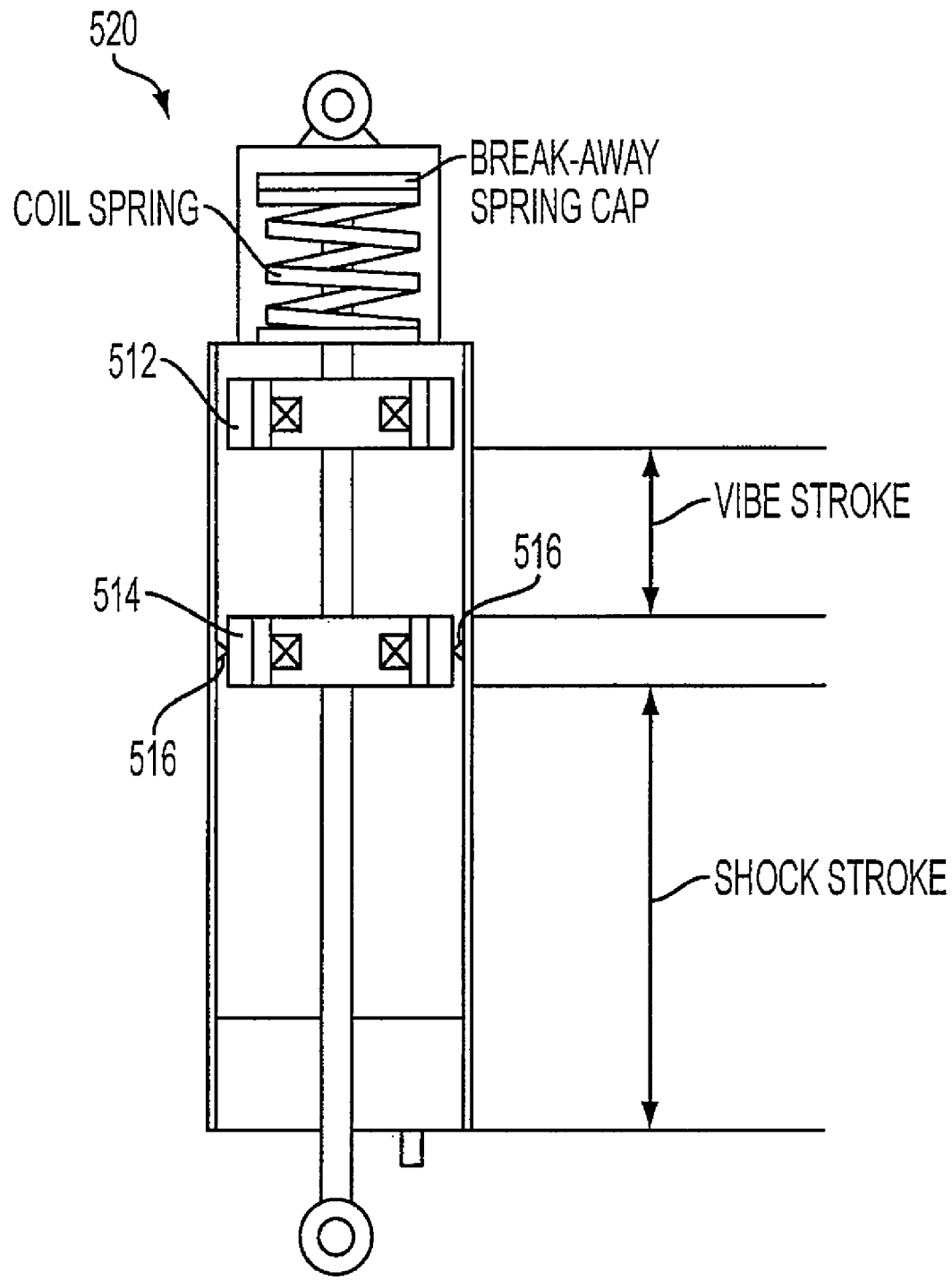
FIG. 28 is an exemplary illustration of a dual-goal energy absorption apparatus, according to an aspect of the invention.

In the dual-goal energy absorption apparatus 520 of FIG. 28, supplementary MR valve 514 is fixed to apparatus 520 via a breakaway mechanism 516. In this configuration, however, supplementary MR valve 514 is physically in the way of primary MR valve 512. During a shock event, once a predetermined vibration stroke capability is exceeded, primary MR valve 512 bears down on supplemental MR valve 514 causing supplemental MR valve 514 to breakaway and begin moving, which increases the damper force. These configurations can be used with any VPEAs utilizing a piston to increase force, and can be combined with any stiffness elements including, but not limited to, any of the stiffness elements disclosed herein.

Figure 29:
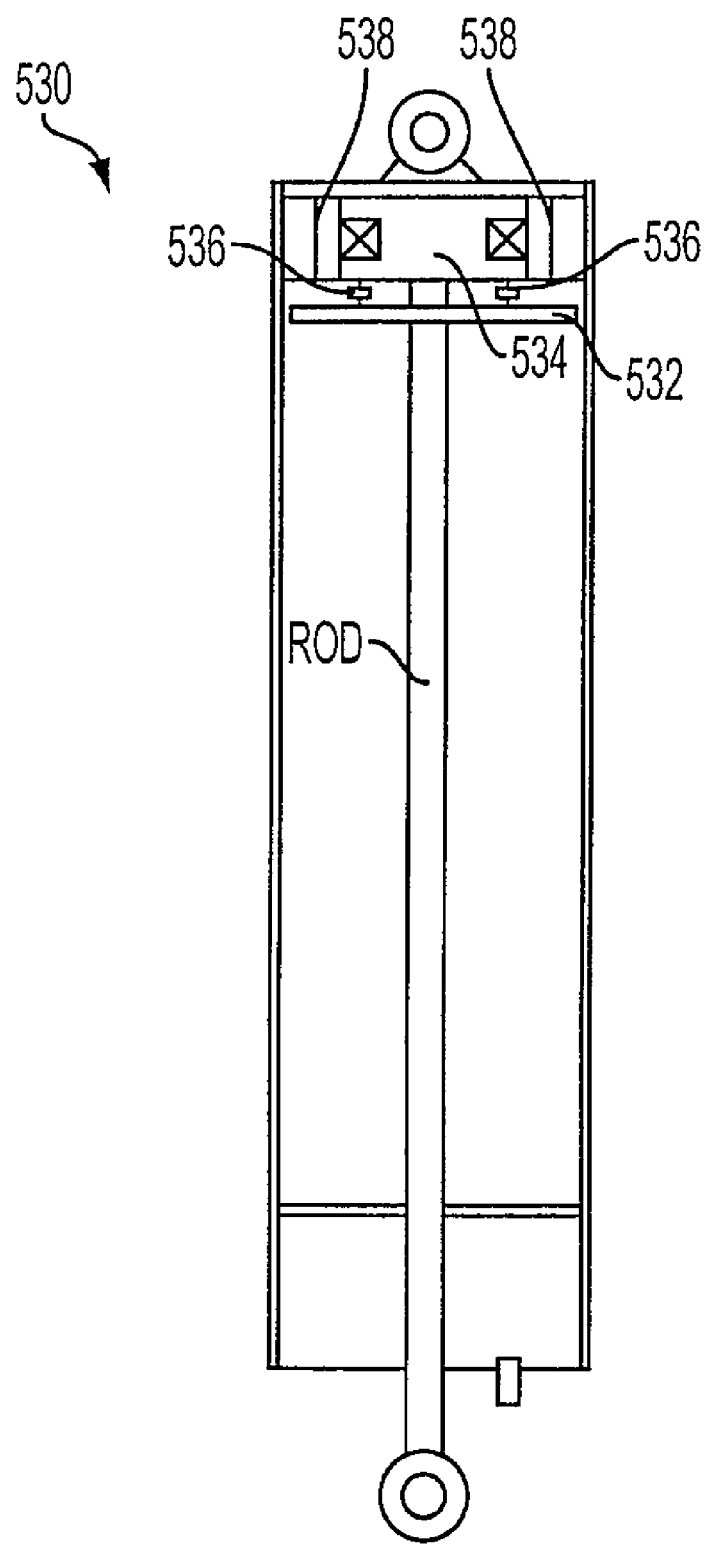
FIG. 29 is an exemplary illustration of a dual-goal energy absorption apparatus, according to an aspect of the invention.

Another method of supplementing the force of a fluid damper to meet shock requirements while maintaining low off-state viscous damping during normal operation is via use of a speed dependent valve. FIG. 29, for example, illustrates a dual-goal energy absorption apparatus 530 having such a configuration, wherein a flow restriction disc 532 may be attached to a piston 534 via a flexible connection mechanism 536. During low amplitude vibration, the pressure within apparatus 530 is low causing orifice 538 to remain open, thus resulting in a low viscous damping component. During a shock event, high piston speeds result in high pressure which tends to force the flow restriction disc 532 to restrict the orifice 538, thus greatly increasing the viscous damping force component.

Figure 30:
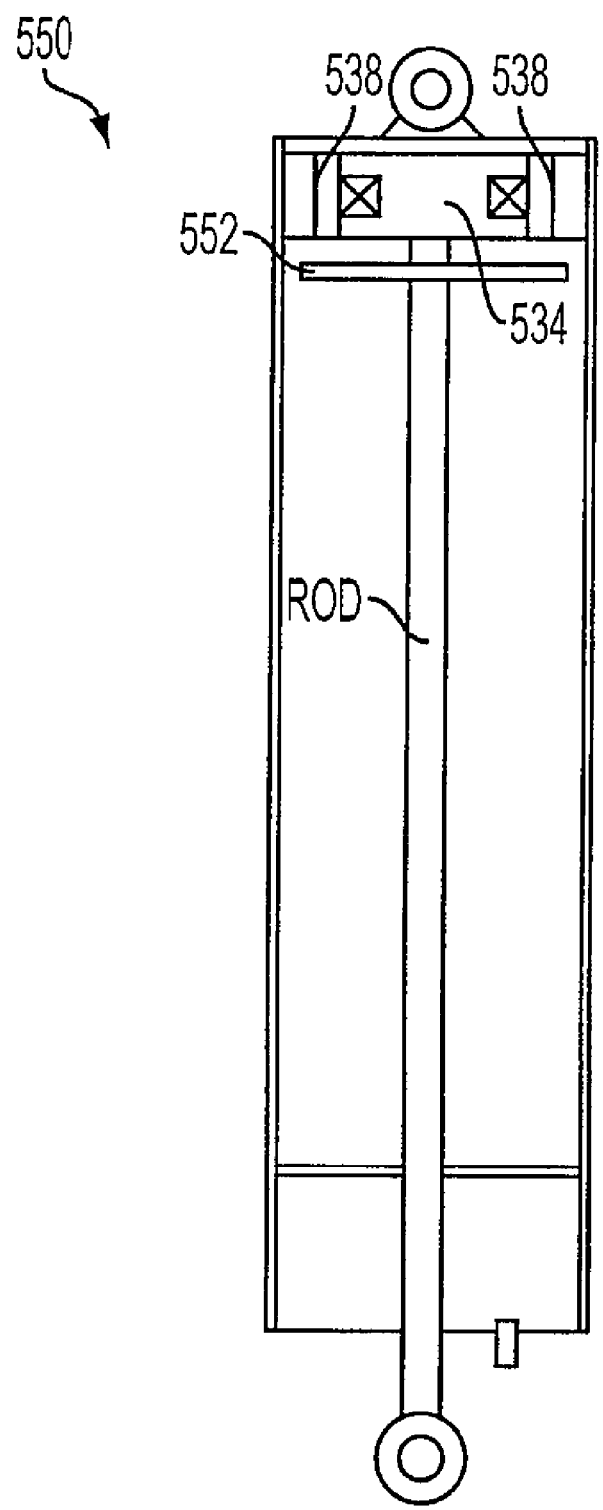
FIG. 30 is an exemplary illustration of a dual-goal energy absorption apparatus, according to an aspect of the invention.

FIG. 30 depicts a dual-goal energy absorption apparatus 550 (with a similar configuration to that of FIG. 29) including a flow restriction disc 552. However, in FIG. 30, the flexibility of disc 552 lies in the flow restriction disc 552 itself and, thus, disc 552 flexes under high piston speed to restrict the orifice 538.

The configurations illustrated in FIGS. 29-30 can be used with any VPEAs utilizing a valve that generates a force by restricting fluid flow, and can be combined with any stiffness elements including, but not limited to, any of the stiffness elements disclosed herein.

Other configurations of a dual-goal energy absorption apparatus that provides both shock mitigation and vibration isolation may be implemented. As such, the foregoing description and accompanying drawing figures should not be viewed as limiting.

Control Strategies.

Having provided an explanation of the one or more components that may comprise system 100 (FIG. 1) as well as the alternative design configurations thereof, examples of various control strategies for vibration isolation and/or shock mitigation will now be discussed.

Figure 31:
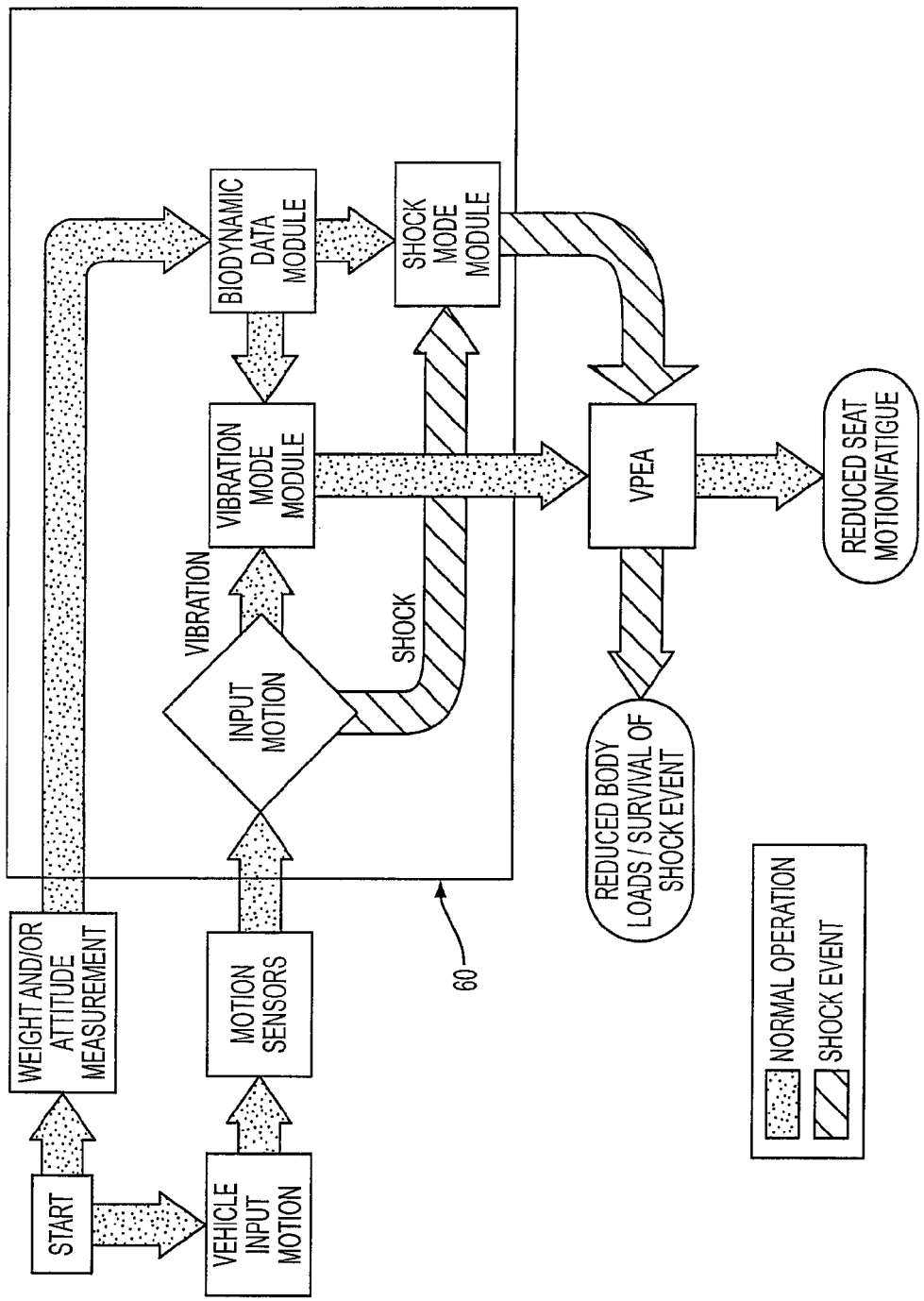
FIG. 31 is an exemplary illustration of a control-flow diagram, according to an aspect of the invention.
Figure 32:
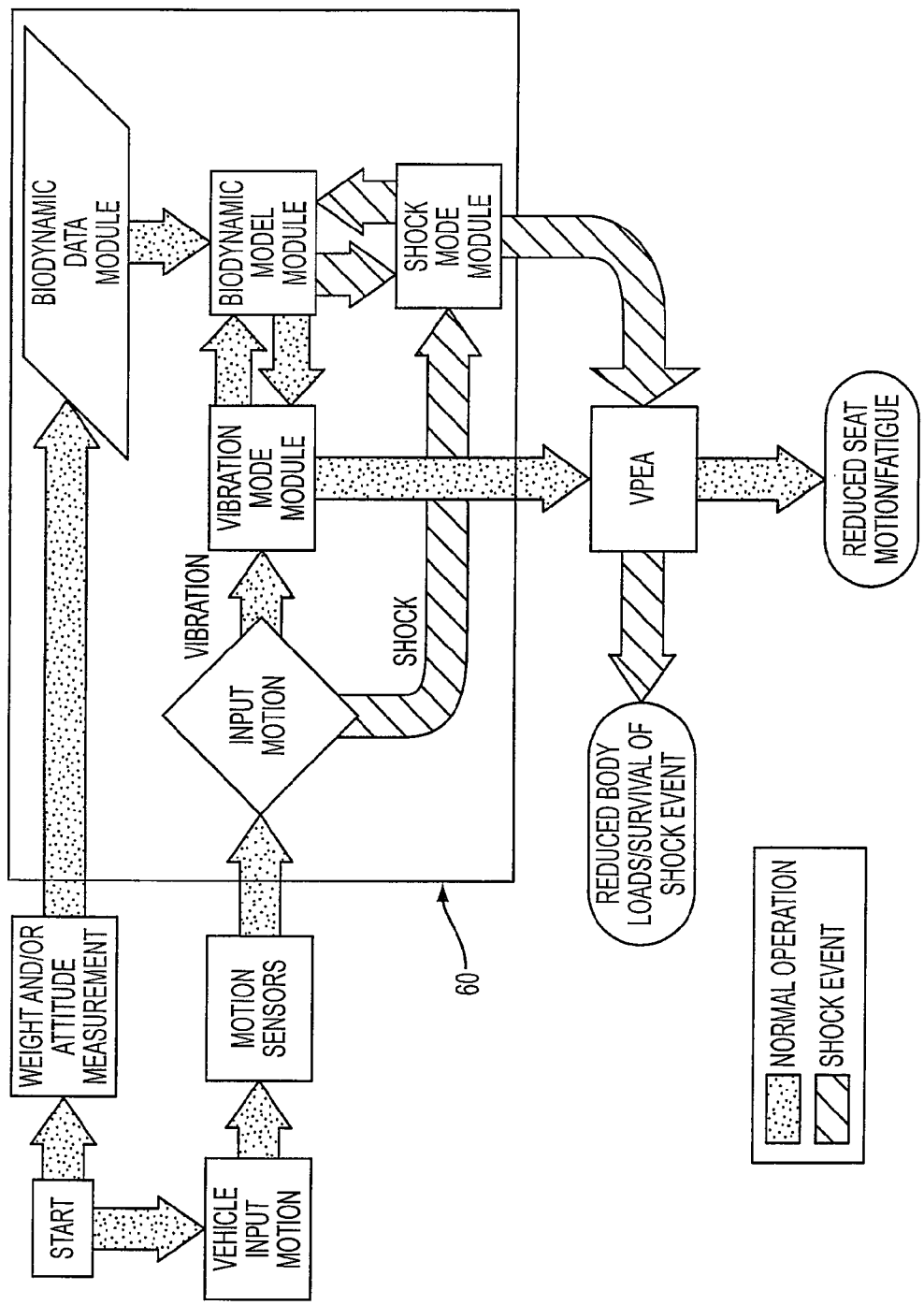
FIG. 32 is an exemplary illustration of a control-flow diagram, according to an aspect of the invention.
Figure 33:
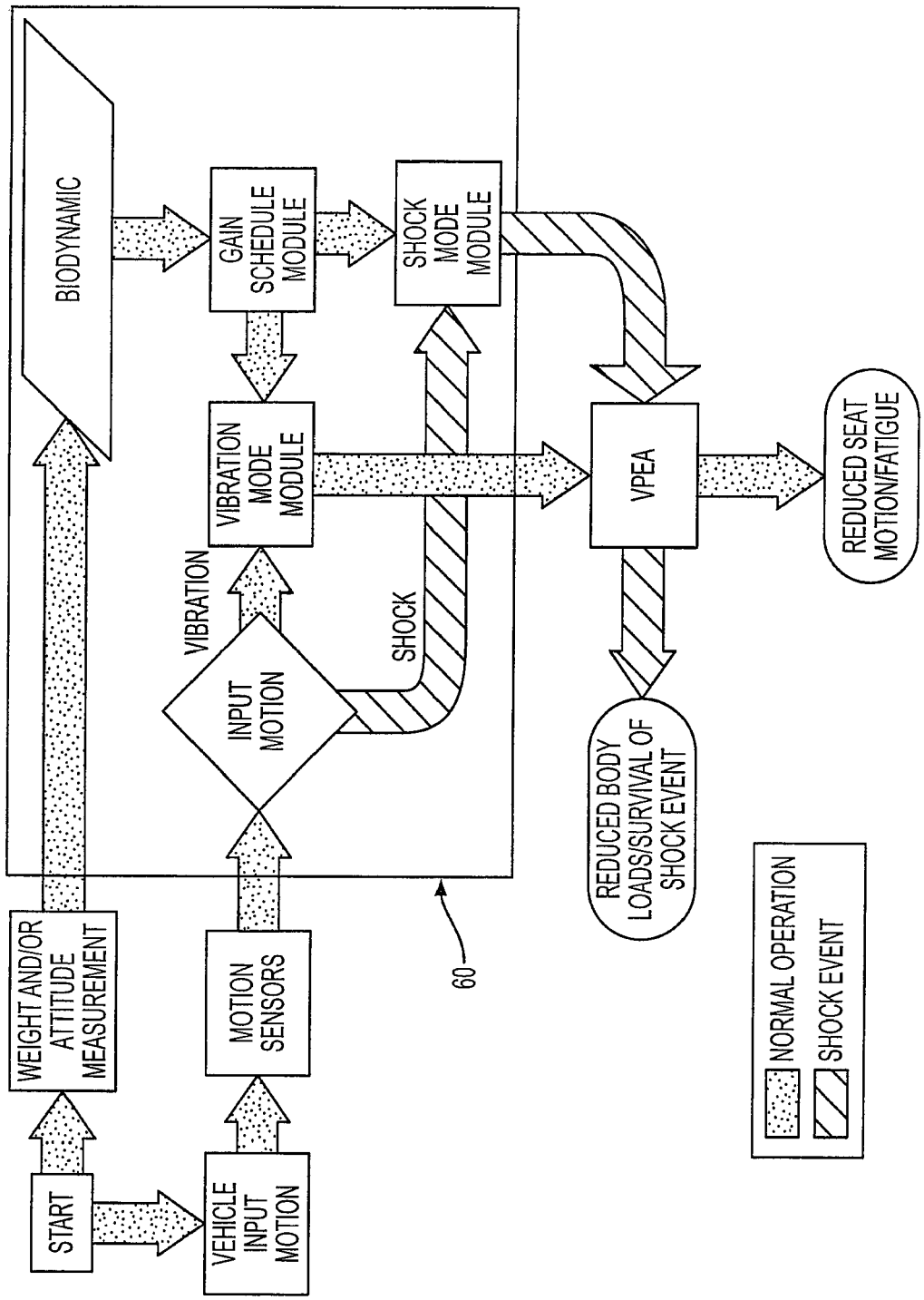
FIG. 33 is an exemplary illustration of a control-flow diagram, according to an aspect of the invention.

FIGS. 31-33 are exemplary control-flow diagrams for various implementations of the invention, wherein controller 60 operates as a dual-mode controller having a first control mode (e.g., a normal or vibration control mode), and a second control mode (e.g., a shock control mode). Controller 60 may function to provide vibration isolation during normal vehicle operation, and to mitigate (or prevent) bodily injury to an occupant of vehicle seat 20 during a vehicle shock event.

It should be understood that the VPEA illustrated in FIGS. 31-33 may comprise VPEA 30 alone or in combination with one or more FPEAs 40 (not illustrated) and/or stiffness elements 50 (not illustrated) in any number of configurations including, but not limited to, those illustrated in FIGS. 1, and 6-10. Moreover, any of the dual-goal energy absorption apparatuses described in detail above and illustrated in FIGS. 12-15, 17-18, 21-24, and 26-30 may comprise the VPEA of any of FIGS. 31-33.

FIG. 31 is an exemplary illustration of a control flow diagram for a system (and method) wherein controller 60 comprises a dual mode controller and supplies a different control to the VPEA depending on whether the inputs are indicative of normal vehicle operation, or a shock event. In this implementation, controller 60 may comprise one or more of a motion determination module, biodynamic data module, vibration mode module, shock mode module, or other modules, each of which may enable the various functions that aid in vibration isolation and/or shock mitigation. One or more of the foregoing controller modules may be combined. For some purposes, not all modules may be necessary.

According to an aspect of the invention, in operation, controller 60 receives real-time vehicle motion information via measurement signals (controller inputs) from one or more sensors (70a, 70b, . . . 70n) as described in detail above. Controller 60 may also receive occupant weight from a weight indication mechanism 72 (e.g., a manual control, one or more weight sensors, or other mechanisms). In some implementations, controller 60 may utilize a fixed occupant weight value (e.g., the weight for a $50^{th}$ percentile male) selected from any number of biodynamic data sources. Controller 60 may also receive attitude measurements via measurement signals (controller inputs) from one or more occupant attitude sensors.

Figure 34:
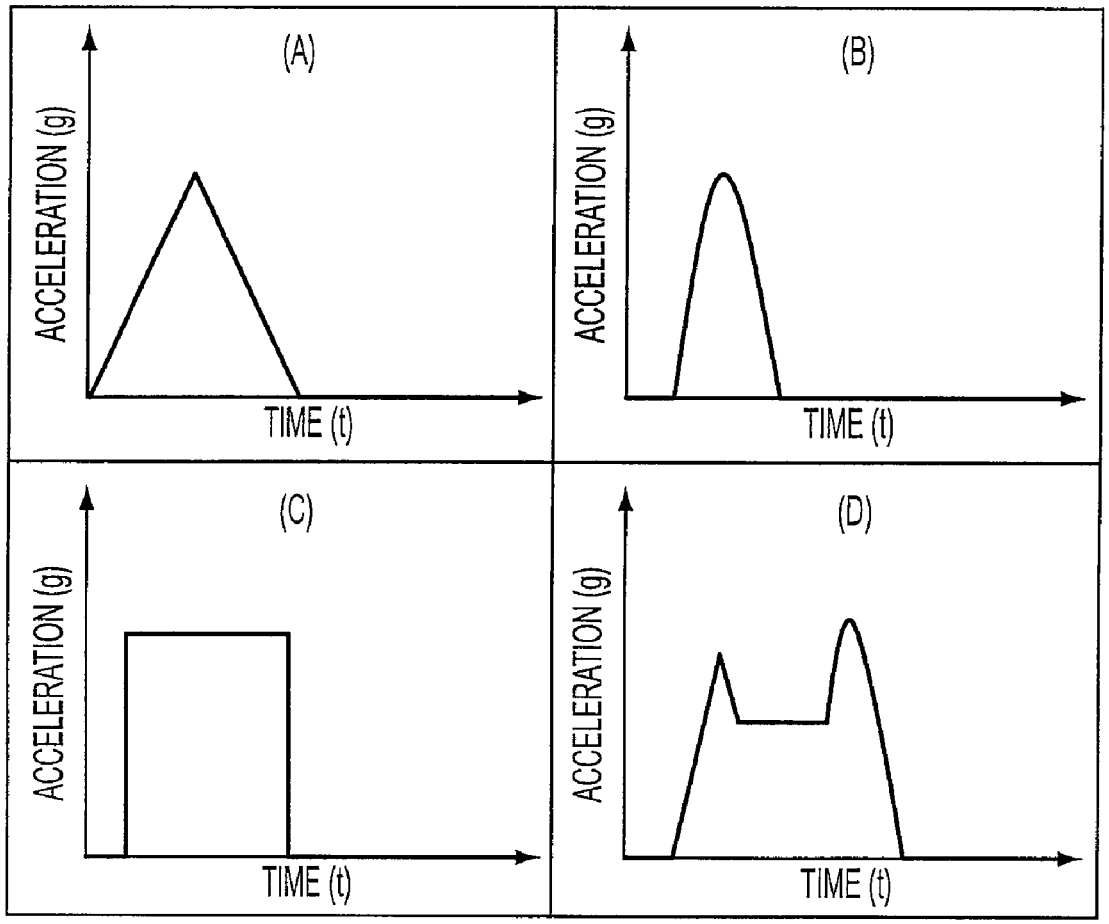
FIG. 34 is an illustration depicting various exemplary shock acceleration pulses, according to an aspect of the invention.

Based on the real-time vehicle motion information received as inputs, a motion determination module determines whether the vehicle is operating under normal conditions, or whether a shock event (or other extreme motion event) is occurring. This determination is made by comparing one or more motion or load measurements (e.g., acceleration, force, etc.) to one or more predetermined values (or thresholds). If one or any combination of sensors measure motion or loads beyond one or more specified thresholds, then controller 60 may enter a shock control mode. Otherwise, controller 60 may remain in a normal (or vibration) control mode. Threshold values may, for example, comprise values just above maximum amplitudes expected during normal vehicle operation. Exemplary acceleration profiles for "shock" events may, in one implementation, be approximated by pulses such as, but not limited to, those illustrated in FIG. 34, including (a) triangle, (b) half-sine, (c) square, and (d) combinations thereof.

In the normal (or vibration) control mode, a vibration mode module (of controller 60) may control the VPEA so as to minimize the motion (e.g., absolute motion or relative motion) of vehicle seat 20, or to minimize the motion of a body part of the occupant (e.g., head, hands, chest, pelvis, etc.). This may be done by isolating seat 20 and reducing motion transferred from the vehicle to seat 20 (e.g., reduce transmissibility). The inclusion of a stiffness element allows the seat resonance to be tuned to be much lower than the excitation input, thereby attaining vibration isolation. The VPEA may then be controlled to actively or semi-actively reduce resonance while maintaining high frequency isolation. Minimizing the motion of the occupant during normal operation will assist in enhancing comfort and reducing fatigue.

In one implementation, controller 60 may utilize a "Skyhook" control method wherein, for example, the VPEA is turned on to a desired force, $F_{des}$ when the absolute velocity of the suspended mass (i.e., the vehicle seat), v, is the same sign as the relative velocity between the suspended mass and the base, (v–$v_o$). This is denoted mathematically as:

$$F_{VPEA} = \begin{cases} F_{des}, & \text{if } v(v-v_o) \geq 0 \\ 0 & \text{if } v(v-v_o) < 0 \end{cases}$$

Examples of this on/off semi-active control philosophy may be found in U.S. Pat. No. 6,115,658 (issued Sep. 5, 2000), entitled "NO-JERK SEMI-ACTIVE SKYHOOK CONTROL METHOD AND APPARATUS" to Ashmadian et al., and U.S. Pat. No. 6,311,110 B1 (issued Oct. 30, 2001), entitled "ADAPTIVE OFF-STATE CONTROL METHOD" to Ivers et al., each of which is hereby incorporated by reference herein in its entirety. The desired force, $F_{des}$, may be rate dependent as in the original implementation of Skyhook control, i.e., $F_{des}$=Cv, where C is the desired damping coefficient. Alternatively, this desired force may be determined through the use of other control theories such as, but not limited to, linear quadratic regulator (LQR) and sliding mode control (SMC). Other vibration control strategies may be implemented.

As recited above, if motion determination module determines that one or any combination of sensors measure motion beyond one or more specified thresholds, then controller 60 may enter a shock control mode. In the shock control mode, a shock mode module (of controller 60) may control the VPEA using any number of control strategies.

In one implementation for example, the VPEA may be adjusted in real-time for optimal combination of occupant body loads and stroking distance to keep the occupant's body loads (e.g., pelvis, spine, neck, etc.) within acceptable limits. As shown in FIG. 31, occupant weight data (e.g., from a manual control, from one or more sensors, or a fixed occupant weight) and/or attitude measurements received as inputs to controller 60 may be utilized to determine load injury thresholds for various parts of the occupant's body (e.g., the pelvis, viscera, spine, neck, and head). Biodynamic data corresponding to injury thresholds, along with other biodynamic data, may be stored in a biodynamic data module (e.g., a look-up table) of controller 60. In some implementations, the stored biodynamic data may comprise statistical data relating to injury criteria (e.g., acceptable load limits) for a range of body parts for a range of body types. Other biodynamic data may be stored.

The shock mode module (of controller 60) may then determine load injury threshold values for various parts of the occupant's body by utilizing statistical data gathered from a range of body types to determine a correlation between a range of acceptable load limits for each body part and the provided weight value.

Loads should be kept under injury threshold values for all body parts. Generally, because the lumbar spine tends take the brunt of the load, optimizing for the load injury threshold of the lumbar spine tends to be adequate to prevent injury to other body parts. However, in certain instances, other body parts (e.g., head, chest, etc.) may be of primary concern. As such, in various implementations, optimization may focus on just one body part, or on keeping loads under injury threshold values for the most injury-susceptible body part. Other optimization strategies may be implemented.

In one implementation, the shock mode module may, for example, determine a load injury threshold for one or more parts of the occupant's body by utilizing minimum load limits from the range of acceptable load limits corresponding to each body part. The shock mode module may then adjust the VPEA in real-time such that actual loads experienced by one or more of the occupant's body parts are maintained at or below the determined load injury thresholds during the vehicle shock event. This may be accomplished, in one regard, by bringing the actual load experienced by the occupant's body part up to, but not in excess of, the determined load injury thresholds while minimizing stroking distance of the variable profile energy absorber.

Figure 35:
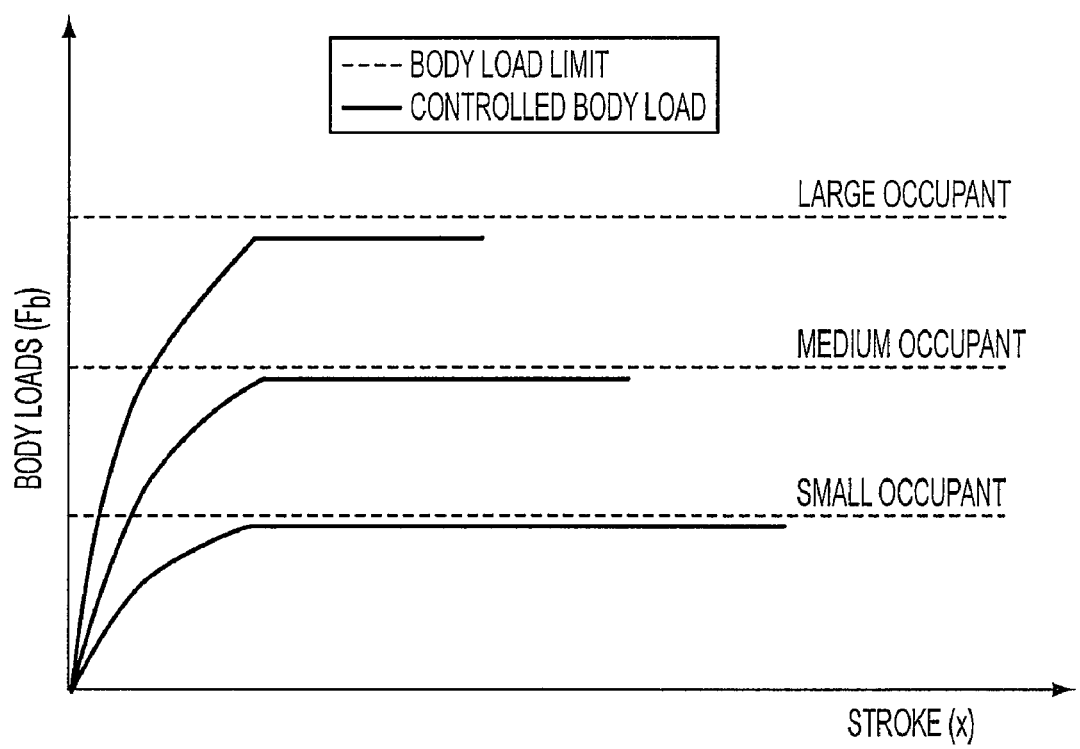
FIG. 35 is an exemplary illustration of controlled load-stroke profiles, according to an aspect of the invention.

In one implementation, an ideally controlled system may have a seat load profile for shock control as shown in FIG. 35. As shown, the force may rise sharply and level out below the occupant's body load limit in order to dissipate the energy in a minimal amount of stroke. For occupants with lower body limit loads, the stroke would be greater (for the same amount of energy dissipated). The seat load is set to not exceed load injury threshold value(s) which may be determined as described above. In this implementation, it is ideal that the seat load reaches the determined level as quickly as possible, and is maintained until all energy is absorbed. Since energy absorbed is equal to the load level multiplied by the stroke, this yields a minimized stroke while preventing injury.

According to an alternative implementation, the VPEA may be adjusted in real-time such that the load-stroke profile is optimally controlled to utilize the full stroke capability of the VPEA, thereby minimizing loads imparted into the body. In this implementation, real-time environmental measurements may be used to tune the system to the harshness of each particular event.

This approach provides an advantage over conventional seat energy absorption systems which tend to be tuned for a fixed shock level (thus, not optimally controlling body loads for other shock levels). For example, in the case of a crashworthy seat for rotorcraft, a FLEA may be tuned for a specific sink rate (e.g., 30 ft/sec). If the actual sink rate was greater than this tuned value (e.g., 50 ft/s), the stroke would have to increase or the system may bottom-out, which may resulting in high loads being imparted into the occupant's spine. Alternatively, if the sink rate was lower than the tuned value (e.g., 15 ft/s), the FLEA will stroke at an unnecessarily high load and would not utilize all of the stroke capability.

A VPEA, however, can modify its load-stroke profile to optimize stroke and load imparted into the occupant for each individual shock event, ensuring that the full stroke is safely utilized while imparting the least possible amount of load into the occupant. As such, according to this implementation, the shock mode module may adjust the VPEA in real-time, based on the weight of the occupant and on real-time motion information received as inputs, so that an actual load experienced by a part of the occupant's body is minimized during the vehicle shock event by utilizing substantially an entire stroke of the variable profile energy absorber.

Since what is directly controlled is the load into the vehicle seat, the most efficient use of stroke (S) is to maintain the VPEA just below a seat load (F) that will cause bodily injury. Accordingly, energy absorbed (EA) by the VPEA is given by:

$$EA = F \times S.$$

Therefore for a given amount of energy needing to be absorbed (EA), maintaining the seat load (F) as high as possible without causing bodily injury minimizes the necessary stroke (S). The energy absorbed is dependent upon the shock scenario. For example, for the crash of an aircraft, the energy to be absorbed may be dependent upon the velocity before impact (V) and the mass of the stroking portion of the laden seat (M):

$$EA = \frac{1}{2} M V^2.$$

Figure 36:
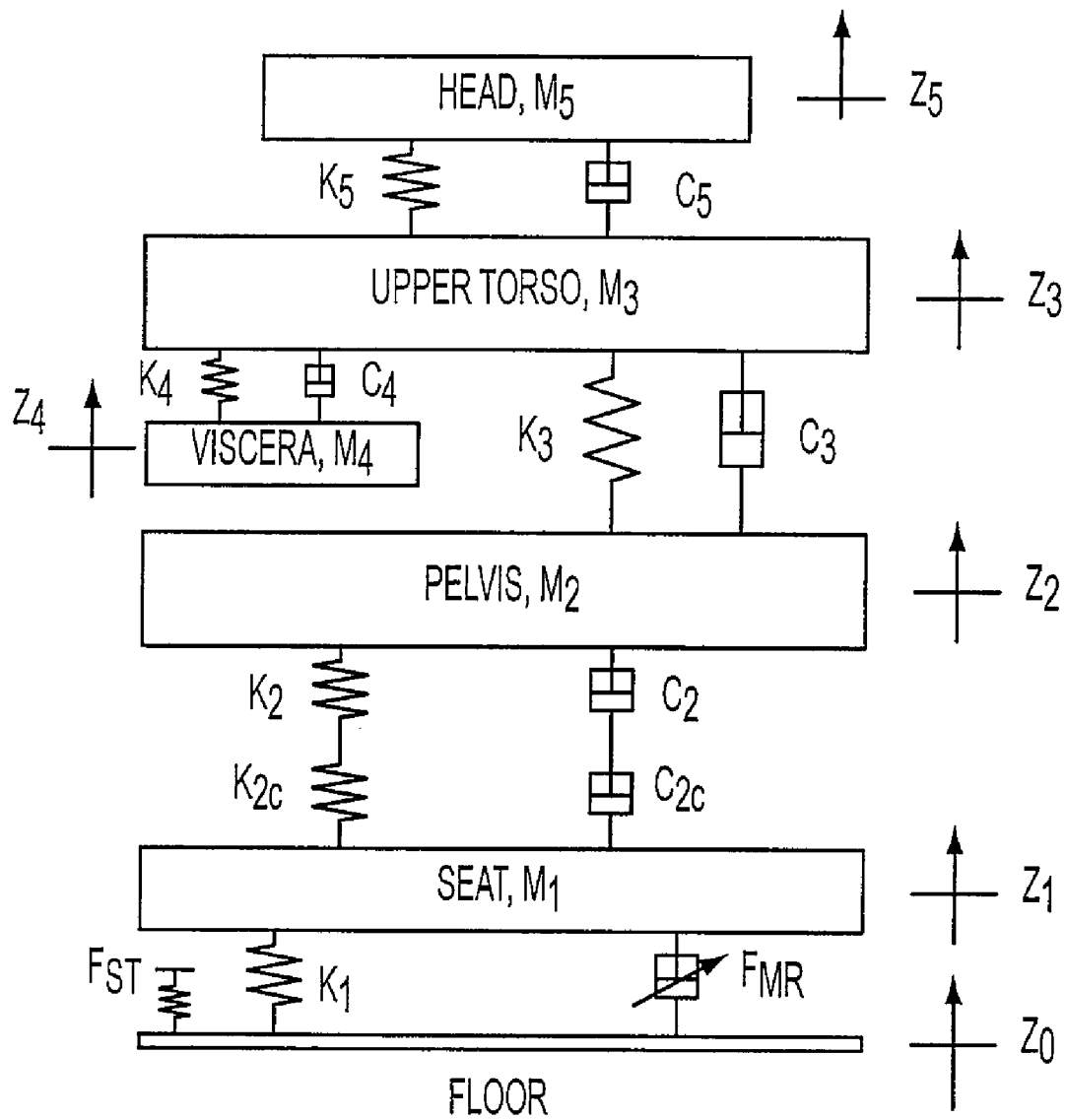
FIG. 36 is an exemplary illustration of a biodynamic model, according to an aspect of the invention.

According to one aspect of the invention, for example when it may not be possible to measure an occupant's body loads directly, controller 60 may use a biodynamic mathematical model (such as, for example, a lumped parameter model illustrated in FIG. 36) along with seat and floor motion data (or other data) to estimate body loads. FIG. 32 is an exemplary illustration of a control flow diagram for a system (and method) wherein controller 60 comprises a dual mode controller that utilizes a biodynamic model to estimate body loads/motion. A biodynamic model module may automatically update parameters (e.g., mass, stiffness, damping, distributions, etc.) for the biodynamic model based upon occupant weight (either measured or manually set as described above) to estimate body loads/motion. The output of the biodynamic model module is then provided to vibration mode module and/or shock mode module for processing using the control strategies described above (with regard to FIG. 31) for vibration isolation and shock mitigation.

One example of a biodynamic model that may be utilized with the invention was provided as a part of U.S. Provisional Patent Application Ser. No. 60/809,386, filed May 31, 2006, which has been incorporated herein by reference in its entirety. The biodynamic model was described in an article identified as: Choi et al., *Mitigation of biodynamic response to vibratory and blast-induced shock loads using magnetorheological seat suspensions*, Proceedings of the Institution of Mechanical Engineers, Part D (Journal of Automobile Engineering), June 2005, vol. 219, no. D6, p. 741-53 (Professional Engineering Publishing).

FIG. 33 is an exemplary illustration of a control flow diagram for a system (and method) wherein controller 60 comprises a dual mode controller that utilizes gain scheduling to control the VPEA. In this implementation, biodynamic data corresponding to occupant mass, motion, loads, etc. are provided to a gain schedule module (from the biodynamic database module). Depending on the real-time vehicle motion information received from the one or more motion sensors (e.g., from one or more sensors (70a, 70b, ... 70n) in FIG. 1), gain schedule module controls the VPEA (using the control strategies described above) for vibration isolation or shock mitigation.

While the foregoing control strategies (FIGS. 31-33) were described in the context of controller 60 as dual-mode controller, it should be understood that, in alternative implementations, controller 60 may comprise a single-mode controller that may operate only in a mode to mitigate injury to an occupant of vehicle seat 20 when an occurrence of a vehicle shock event (or other extreme motion event) is determined.

Any of the foregoing control strategies as described for shock mitigation may be implemented in any such implementations.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. An adaptive energy absorption system for a vehicle seat for mitigating injury to an occupant of the vehicle seat during a vehicle shock event, the system comprising:
    a variable profile energy absorber operatively connected to a vehicle and to the vehicle seat, said variable energy absorber being one of a magnetorheological (MR) fluid damper or an electrorheological (ER) fluid damper having a known load-stroke profile and stroking distance;
    a plurality of sensors including at least a weight sensor for measuring occupant weight, and a vehicle sensor attached to the vehicle and a seat sensor attached to the seat to allow differential measurement of the occupant motion relative to said vehicle; and
    a controller that determines a load injury threshold for a part of the occupant's body; that determines an occurrence of a vehicle shock event based in part on at least one measurement received from the vehicle sensor that exceeds a predetermined value; and that adjusts the variable profile energy absorber in real-time, via a control signal, based on said known load-stroke profile and stroking distance to impart minimal load into the seat and occupant in order to maintain an actual load experienced by the occupant's body part at or below the determined load injury threshold during the vehicle shock event.

2. The system of claim 1, wherein the controller determines a load injury threshold for at least one of the occupant's pelvis, viscera, spine, neck, or head.

3. The system of claim 1, wherein the controller adjusts the variable profile energy absorber so as to bring the actual load experienced by the occupant's body part up to, but not in excess of, the determined load injury threshold while minimizing stroking distance of the variable profile energy absorber.

4. The system of claim 1, wherein the variable profile energy absorber comprises a magnetorheological (MR) fluid damper.

5. The system of claim 1, wherein the load injury threshold is determined based in part on an occupant weight value derived from said weight sensor.

6. The system of claim 1, wherein the weight sensor comprises a control for manually selecting the weight of the occupant.

7. The system of claim 1, wherein the weight sensor comprises a strain gauge for measuring the weight of the occupant.

8. The system of claim 5, wherein the controller determines the load injury threshold for the part of the occupant's body by utilizing statistical data gathered from a range of body types to determine a correlation between a range of acceptable load limits for the body part and the occupant weight value.

9. The system of claim 8, wherein the statistical data is stored in a data table accessible by the controller.

10. The system of claim 8, wherein the controller determines a load injury threshold for the part of the occupant's body by utilizing a minimum load limit from the range of acceptable load limits.

11. The system of claim 5, wherein the controller utilizes a gain schedule to adjust the variable profile energy absorber, the gain schedule receiving as input statistical data that is selected based in part on the occupant weight value.

12. The system of claim 5, wherein the controller utilizes output from a biodynamic model when generating the control signal to adjust the variable profile energy absorber, the biodynamic model receiving as input at least one measurement from the sensor and statistical data that is selected based in part on the occupant weight value.

13. The system of claim 1, wherein the vehicle sensor and the seat sensor comprise sensors for measuring one or more of position, velocity, acceleration, or jerk of the vehicle.

14. The system of claim 1, wherein the vehicle sensor comprises a sensor for measuring loads experienced by the vehicle.

15. The system of claim 1, wherein the vehicle sensor comprises a sensor associated with the vehicle.

16. The system of claim 1, wherein the plurality of sensors comprise sensors for measuring one or more of position, velocity, acceleration, or jerk of the vehicle seat.

17. The system of claim 1, wherein the plurality of sensors comprise sensors for measuring loads experienced by the vehicle seat.

18. The system of claim 1, wherein the plurality of sensors further comprise one or more occupant-mounted sensors for providing real-time occupant body load measurements to the controller.

19. The system of claim 1, wherein the plurality of sensors further comprise one or more occupant-mounted sensors for providing real-time occupant body motion measurements to the controller.

20. The system of claim 1, wherein the plurality of sensors further comprise at least one sensor for measuring occupant attitude within the vehicle seat.

21. The system of claim 1, further comprising a power source, independent from a power source associated with the vehicle, that provides power to the variable profile energy absorber, said plurality of sensors, and controller.

22. The system of claim 1, wherein the variable profile energy absorber, said plurality of sensors, and controller are powered by a power source associated with the vehicle.

23. In an adaptive energy absorption system for a vehicle seat comprising a variable profile energy absorber operatively connected to a vehicle and to the vehicle seat, a sensor mounted on said vehicle, and a controller in communication with both said sensor and said variable profile energy absorber, a method for mitigating injury to an occupant of the vehicle seat during a vehicle shock event, the method comprising:
   determining a load injury threshold for a part of the occupant's body for at least one of the occupant's pelvis, viscera, spine, neck, or head;
   receiving measurements from said sensor at said controller;
   said controller determining an occurrence of a vehicle shock event based on at least one measurement received from said sensor that exceeds a predetermined value; and
   upon determining an occurrence of said vehicle shock event, generating a control signal at said controller and communicating said control signal to said variable profile energy absorber to adjust the variable profile energy absorber in real-time such that an actual load transferred to the occupant's body part from said vehicle shock event is maintained at or below the determined load injury threshold during the vehicle shock event in order to mitigate injury to the occupant of the vehicle seat.

24. An adaptive energy absorption system for a vehicle seat for mitigating injury to an occupant of the vehicle seat during a vehicle shock event, the system comprising:
   a variable profile energy absorber operatively connected to a vehicle and to the vehicle seat and having a known load-stroke profile and stroke distance;
   a sensor; and
   a controller that determines an occurrence of a vehicle shock event based in part on at least one measurement received from the sensor that exceeds a predetermined value; and that adjusts, via a control signal, the variable profile energy absorber based in part on the at least one measurement received from the sensor and on said known load-stroke profile and stroke distance, such that an actual load experienced by a part of the occupant's body is minimized during the vehicle shock event by utilizing substantially the entire known stroke distance of the variable profile energy absorber.

25. In an adaptive energy absorption system for a vehicle seat comprising a variable profile energy absorber operatively connected to a vehicle and to the vehicle seat and having a known load-stroke profile and stroke distance, a sensor mounted on said vehicle, and a controller in communication with both said sensor and said variable profile energy absorber, a method for mitigating injury to an occupant of the vehicle seat during a vehicle shock event, the method comprising:
   receiving one or more measurements from said sensor at said controller;
   said controller determining an occurrence of a vehicle shock event based on at least one measurement received from said sensor that exceeds a predetermined value; and
   upon said controller determining an occurrence of a vehicle shock event, generating a control signal at said controller and communicating said control signal to said variable profile energy absorber to adjust the variable profile energy absorber based in part on the at least one measurement received from the sensor, based on said known load-stroke profile and stroke distance, such that an actual load transferred to the occupant's body is minimized during the vehicle shock event by utilizing substantially the stroke distance of the variable profile energy absorber in order to mitigate injury to the occupant of the vehicle seat.

* * * * *